ELECTRONIC CONTROL CIRCUITS FOR WEIGHT CHECKING APPARATUS

Filed Oct. 1, 1959

INVENTORS
THOMAS E. ROBERTS, JR.
WILLIAM J. FOWLER
BY Hans G. Hoffmeister
ATTORNEY Jan. 8, 1963 T. E. ROBERTS, JR., ETAL 3,072,254

ELECTRONIC CONTROL CIRCUITS FOR WEIGHT CHECKING APPARATUS

Filed Oct. 1, 1959 8 Sheets-Sheet 2

INVENTORS
THOMAS E. ROBERTS, JR.
WILLIAM J. FOWLER

BY Hans G. Hoffmeister
ATTORNEY

INVENTORS
THOMAS E. ROBERTS, JR.
WILLIAM J. FOWLER
BY Hans G. Hoffmeister
ATTORNEY Jan. 8, 1963 T. E. ROBERTS, JR., ETAL 3,072,254

ELECTRONIC CONTROL CIRCUITS FOR WEIGHT CHECKING APPARATUS

Filed Oct. 1, 1959 8 Sheets-Sheet 4

INVENTORS
THOMAS E. ROBERTS, JR.
WILLIAM J. FOWLER

BY Hans G. Hoffmeister

ATTORNEY

ELECTRONIC CONTROL CIRCUITS FOR WEIGHT CHECKING APPARATUS

Filed Oct. 1, 1959 8 Sheets-Sheet 5

DIAGRAM UNIT B FIG. 5

INVENTORS
THOMAS E. ROBERTS, JR.
WILLIAM J. FOWLER

BY Hans G. Hoffmeister
ATTORNEY

ELECTRONIC CONTROL CIRCUITS FOR WEIGHT CHECKING APPARATUS

Filed Oct. 1, 1959 8 Sheets-Sheet 6

INVENTORS
THOMAS E. ROBERTS, JR.
WILLIAM J. FOWLER
BY Hans G. Hoffmeister
ATTORNEY INVENTORS
THOMAS E. ROBERTS, JR.
WILLIAM J. FOWLER
BY Hans G. Hoffmeister
ATTORNEY Jan. 8, 1963 T. E. ROBERTS, JR., ETAL 3,072,254
ELECTRONIC CONTROL CIRCUITS FOR WEIGHT CHECKING APPARATUS
Filed Oct. 1, 1959 8 Sheets-Sheet 8
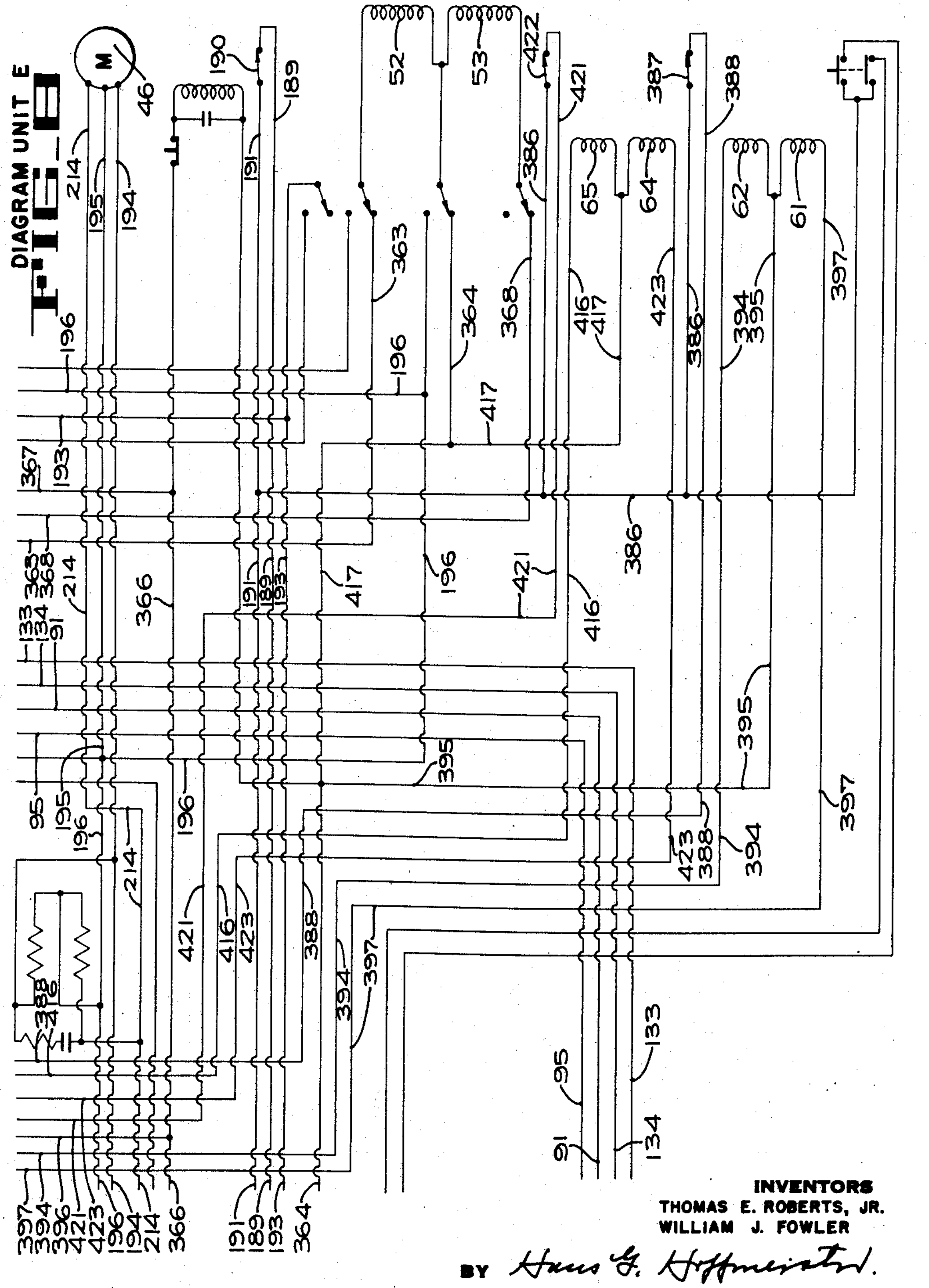
FIG_8 DIAGRAM UNIT E
INVENTORS
THOMAS E. ROBERTS, JR.
WILLIAM J. FOWLER
BY Hans G. Hoffmeister
ATTORNEY 3,072,254
Patented Jan. 8, 1963

3,072,254

ELECTRONIC CONTROL CIRCUITS FOR WEIGHT CHECKING APPARATUS

Thomas E. Roberts, Jr., Saratoga, and William J. Fowler, San Jose, Calif., assignors to FMC Corporation, a corporation of Delaware Filed Oct. 1, 1959, Ser. No. 843,798
5 Claims. (Cl. 209—121)

The present invention appertains in general to weight checking apparatus, and more particularly to electronic control circuits for weight checking apparatus.

An object of the present invention is to provide improved electronic control circuits for weight checking apparatus.

Another object is to provide electronic control circuits for weight checking apparatus having timing circuits that are more accurate than circuits previously provided in such apparatus.

Another object of the present invention is to provide electronic control circuits for weight checking apparatus wherein the timing operations thereof are independent of the dimension of a weighed article.

Another object of the present invention is to provide electronic control circuits for weight checking apparatus that are economical to manufacture without sacrificing reliability and accuracy.

Other objects and advantages of the present invention will become apparent from the following description and drawings, in which.

Figure 3:
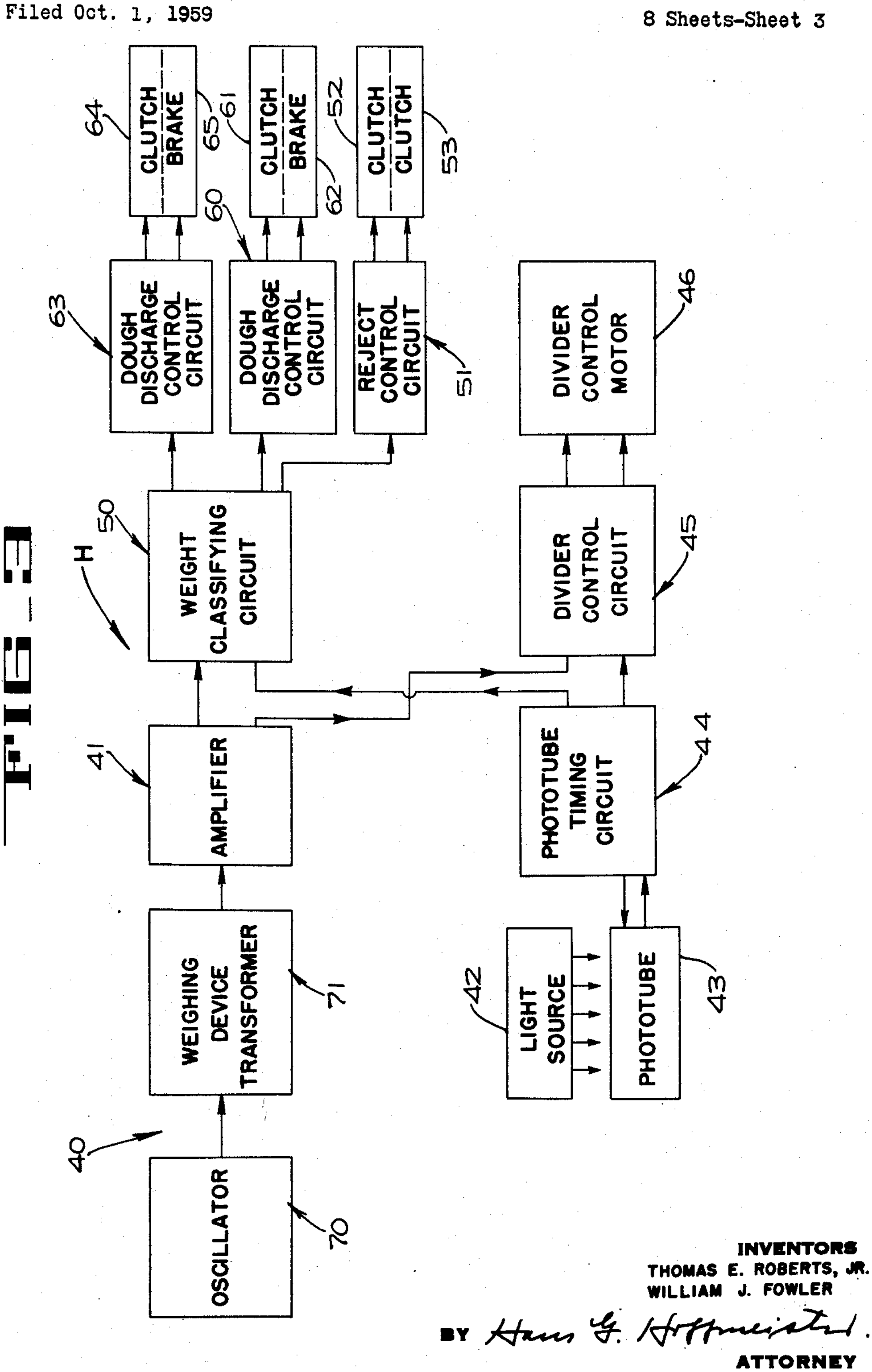
FIG. 3 is a block diagram of the electronic control circuits of the present invention.

FIGS. 4–8, inclusive, comprise units A, B, C, D and E, respectively, of a control diagram which, when arranged in the manner shown in FIG. 9, illustrate schematically the electronic circuits shown in block diagram in FIG. 3.

Figure 1:
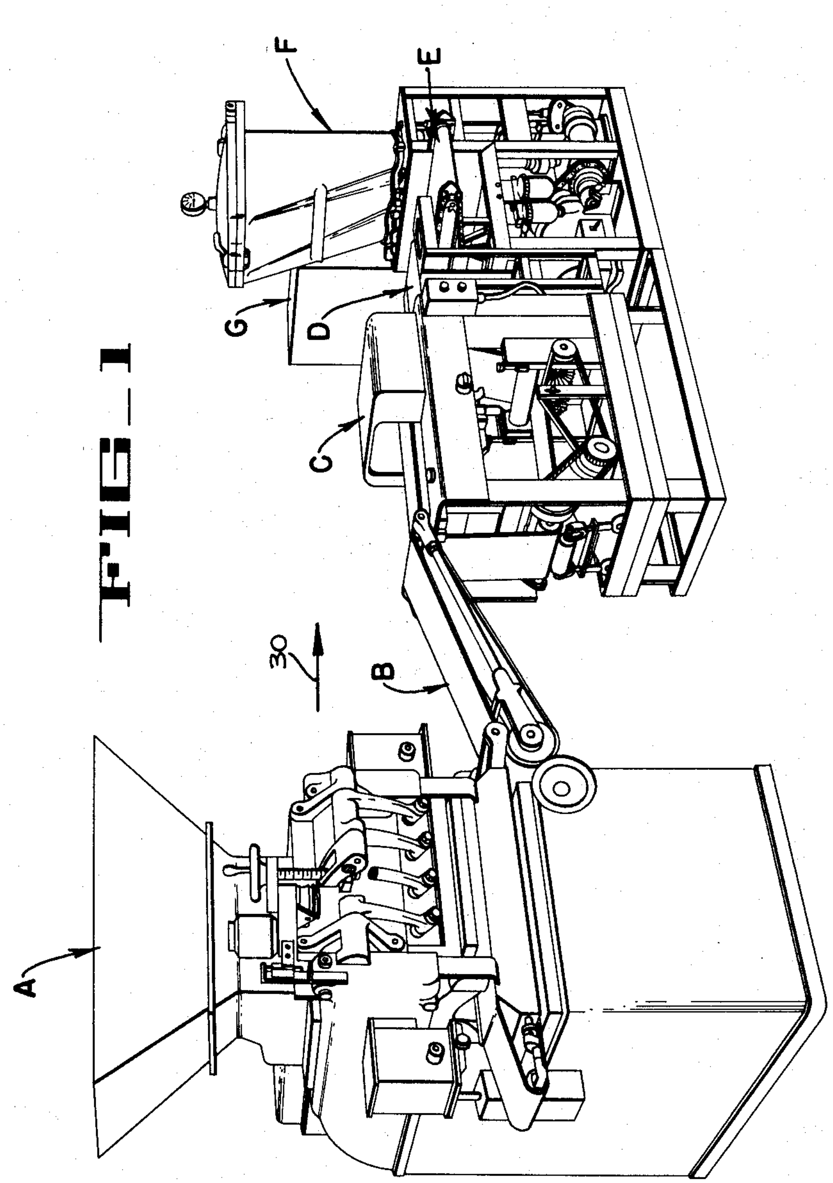
FIG. 1 is a perspective view of a weight checking and correcting apparatus illustrated in operative association with a dough dividing machine.
Figure 2:
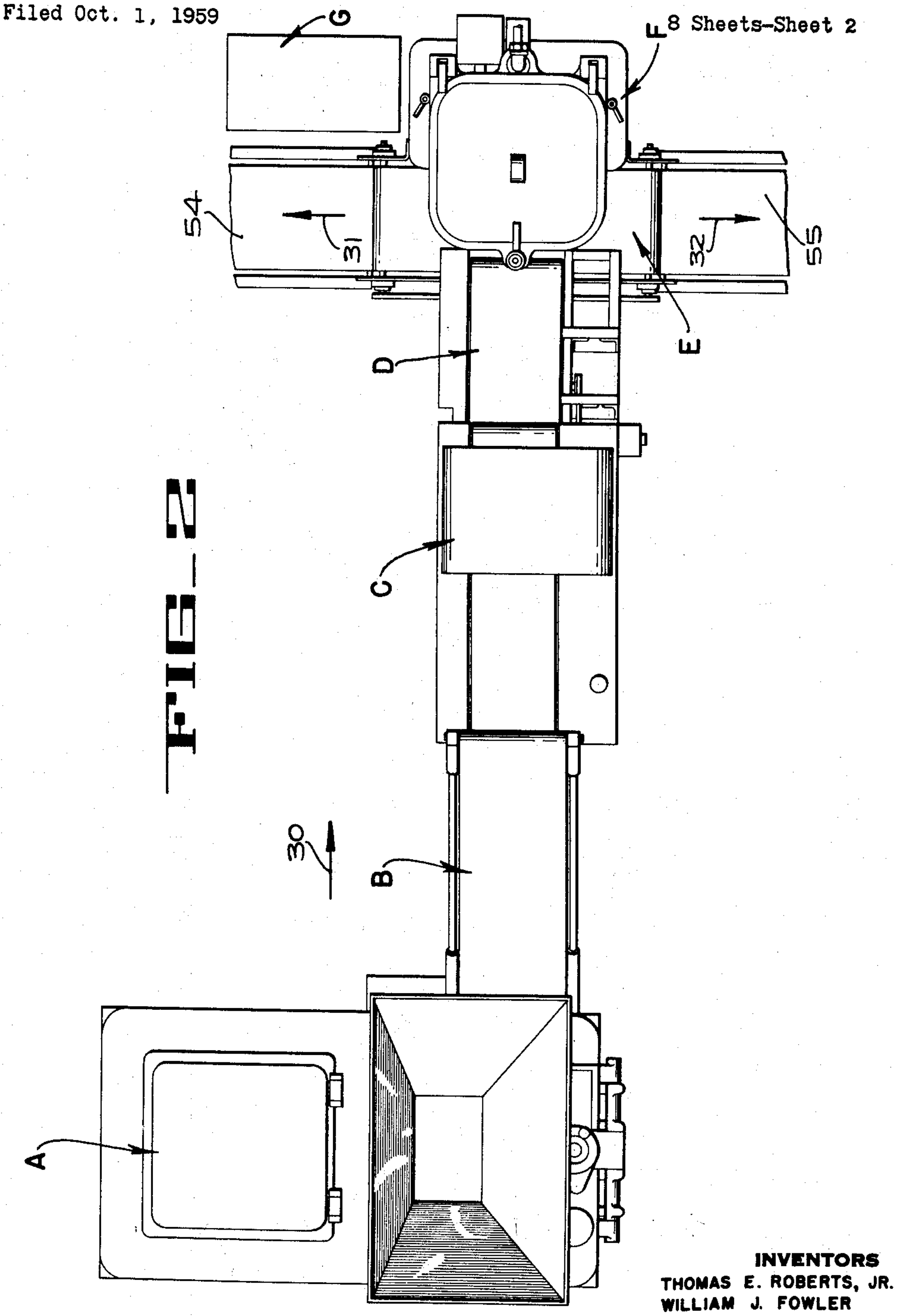
FIG. 2 is a plan view of the weight checking and correcting apparatus shown with the dough dividing machine.

In FIGS. 1 and 2 is illustrated a conventional dough dividing machine A that forms individual measured pieces of dough from a mass of dough, each individual piece being adapted to be formed into a single article, such as a loaf of bread. The machine advances the measured pieces of dough in succession onto a continuously operated conveyor B, which is inclined upwardly and away from the dough dividing machine A.

The conveyor B feeds the spaced pieces of dough in succession onto a weight checking apparatus C, which continuously advances the pieces of dough in the direction indicated by an arrow 30. The weight checking apparatus C weighs the continuously advancing pieces of dough individually and transmits successive voltage signals that are respectively representative of the weight of the successively weighed pieces of dough.

The pieces of dough are advanced from the weight checking apparatus C onto a continuously operated transfer conveyor D, which feeds the pieces of dough to a reversible conveyor E. The pieces of dough discharged onto the reversible conveyor E are continuously advanced transversely of the conveyor D either in the direction indicated by an arrow 31 (FIG. 2) or in the direction indicated by an arrow 32 (FIG. 2). The reversible conveyor E is driven at a sufficient speed relative to the spacing between successive pieces of dough so that each piece of dough is supported individually by the reversible conveyor E.

Disposed adjacent the reversible conveyor E and spaced from the weight checking apparatus C is an apparatus F for forming and discharging relatively small supplemental quantities of dough. When the main piece of dough, that was formed by the dough divider A and is advancing for discharge onto the reversible conveyor E, is deficient in weight within a predetermined range, the dough increment-adding apparatus F is operated to deposit onto such an underweight piece of dough a selected quantity of supplemental dough commensurate with the amount the piece of dough is deficient in weight. As will be explained presently, the apparatus F is adapted to selectively provide supplemental increments of dough in three different sizes, since it is capable of discharging individually one of two increments of different sizes or of discharging both increments simultaneously.

The foregoing apparatus and units are described in detail in a pending application of John A. Abbott et al., U.S. Serial No. 789,124, filed January 26, 1959. The assignee of the aforementioned application is also the assignee of the present application.

Adjacent the dough discharging apparatus F is a control unit G (FIGS. 1 and 2) for mounting the components of electronic control circuits H (FIGS. 3–8) which receive the successive voltage signals transmitted by the weight checking apparatus C. As previously described, the successive voltage signals are, respectively, representative of the weight of successively weighed pieces of dough. The electronic control circuits H perform several control operations in response to the voltage signals and in response to the advancement of pieces of dough on the weight checking apparatus C. One control operation is the adjustment of the dough dividing machine A for regulating the weight of measured pieces of dough formed therein to compensate for a weight variation between a desired weight and the average weight of pieces of dough advancing successively across the weight checking apparatus C.

Another operation of the electronic control circuits H is the regulation of the direction of travel of the reversible conveyor E. When a piece of dough weighing more than a prescribed weight is discharged by the transfer conveyor D onto the reversible conveyor E, the reversible conveyor E advances the piece of dough of prescribed weight in the direction shown by the arrow 31 (FIG. 2) for further processing. In case a piece of dough of a weight less than said prescribed weight and less than a predetermined minimum weight is processed by the weight checking apparatus C, the electronic control circuits H reverse the direction of travel of the conveyor E to advance the piece of dough in the direction shown by the arrow 32, thereby rejecting the piece of dough weighing less than the predetermined minimum weight. The piece of dough weighing in a range between the prescribed weight and the predetermined minimum weight is capable of being brought up to weight and, when brought up to weight, is advanced by the reversible conveyor E in the direction shown by the arrow 31 toward a subsequent processing station of the plant.

Still another operation of the electronic control circuits H is the controlling of the operation of the dough increment adder F to vary the quantity of dough discharged thereby, when a piece of dough weighing in the correctible range between the prescribed weight and the predetermined minimum weight is discharged by the conveyor D onto the conveyor E. The electronic control circuits H classify each of such pieces of dough into a weight group corresponding to the amount the individual pieces of dough weigh less than the prescribed weight and then activate the dough discharging apparatus F to deposit onto that piece of dough a selected quantity of dough commensurate with the amount that the piece of dough weighs less than the prescribed weight.

Illustrated diagrammatically in FIGURE 3 is an electromechanical transducer 40 of the weight checking apparatus C which transmits successive voltage signals that are respectively representative of the weight of pieces of dough advancing in succession across the weight checking apparatus C. The voltage signals are fed to a suitable amplifier 41. Each piece of dough that advances across the weight checking apparatus C interrupts a beam of light projected by a source of light 42 toward a phototube 43, just before maximum deflection is attained by the scale of the weight checking apparatus C. When the beam of light emitted by the light source 42 is interrupted by a continuously advancing piece of dough, the phototube 43 transmits a control signal to operate a phototube timing circuit 44.

The electronic control circuits H, that are employed in the weight checking and correcting apparatus include a dough divider control circuit 45 that is responsive to the successive voltage signals transmitted by the transducer 40 and is responsive to the operation of the phototube timing circuit 44 to convert the successive voltage signals into a series of pulses. The series of pulses are respectively representative of the difference between a desired weight and the weights of the pieces of dough advancing in succession across the weight checking apparatus C. The control circuit 45 averages the series of pulses to produce an average signal and compares the average signal with reference voltages for controlling the direction of rotation of a dough divider control motor 46 and the angular displacement of the shaft of the motor 46. In a manner described in detail in the aforementioned application, the dough dividing machine A is adjusted through the operation of its motor to regulate the weight of pieces of dough formed therein to compensate for a weight variation between a desired weight and the average weight of pieces of dough advancing in succession across the weight checking apparatus C.

In addition to the adjustment of the dough divider A for regulating the weight of pieces of dough ejected therefrom, the electronic control circuits H control the direction of travel of the reversible conveyor E and control the operation of the dough increment-adding apparatus F. Toward this end, the electronic control circuits H include a weight classifying circuit 50 that is operated in timed relation with the successive advancement of pieces of dough across the weight checking apparatus C by the phototube timing circuit 44 and is operated in response to the successive voltage signals transmitted by the electromechanical transducer 40 for classifying individually the pieces of dough in accordance with their weight.

When a piece of dough which is of the prescribed weight, or is overweight, is advanced across the weight checking apparatus C, the weight classifying circuit 50 operates to prevent activation of a reject control circuit 51, so that the normally operated clutch 52 of the reversible conveyor E remains engaged at the time the piece of dough of the prescribed weight or overweight is discharged onto the reversible conveyor E. While the clutch 52 is engaged, the conveyor E advances the piece of dough to a conveyor 54 (FIG. 2) for further processing. The operation of the reversible conveyor E in conjunction with the clutch 52 is described in detail in the above-mentioned application.

In case a piece of dough of a weight less than a predetermined minimum weight advances across the weight checking apparatus C, the weight classifying circuit 50 activates the reject control circuit 51. The activation of the reject control circuit 51 causes a clutch 53 of the reversible conveyor E to be engaged at the time the piece of dough weighing less than the predetermined minimum weight is discharged onto the reversible conveyor E. When the clutch 53 is engaged, the direction of travel of the conveyor E is reversed and the piece of dough weighing less than the predetermined minimum weight is discharged onto a reject conveyor 55 (FIG. 2). The clutch 53, as well as the reversing operation for the conveyor E, is described in detail in the previously mentioned application.

In the event a piece of dough of a weight in the correctible range between the prescribed weight and the predetermined minimum weight is advanced across the weight checking apparatus C, the weight classifying circuit 50 operates to prevent the activation of the reject control circuit 51. Thus, the normally operated clutch 52 is engaged at the time such a piece of dough is discharged onto the reversible conveyor E. While the clutch 52 is engaged, the conveyor E advances continuously the piece of dough toward the conveyor 54.

At the time the weight classifying circuit 50 operates to prevent the activation of the reject control circuit 51, it also classifies the piece of dough, weighing in the correctible range between the prescribed weight and the predetermined minimum weight, in accordance with the amount the piece of dough weighs less than the prescribed weight. If the piece of dough weighs less than the prescribed weight by an amount not in excess of a predetermined quantity, such as ½ oz., the weight classifying circuit 50 activates a dough discharging control circuit 60. The dough discharge control circuit 60 causes a clutch 61 of the dough increment adder F to engage and causes a brake 62 of the increment adder F to release in timed relation with the advancement of the continuously advancing piece of dough so that the dough increment-adder apparatus F projects a measured quantity of dough, such as ½ oz., at the time the continuously advancing piece of dough is discharged from the conveyor D to the reversible conveyor E. The additional quantity of dough is projected onto the main piece of dough and thus, when the piece of dough is advanced by the reversible conveyor E, it meets the prescribed weight requirement. The manner and structure for operating the dough discharging apparatus F to perform the above operation is described in the above-cited application.

In case the piece of dough advancing across the weight checking apparatus C is in the correctible range of weights and weighs less than the prescribed weight by an amount within a selected range, such as between ½ oz. and 1 oz., the weight classifying circuit 50 activates a dough discharge control circuit 63. The dough discharge control circuit 63 causes a clutch 64 of the dough discharging apparatus F to engage and cause a brake 65 of the dough discharging apparatus F to release in timed relation with the advancement of the continuously advancing piece of dough so that the dough discharging apparatus F projects a measured quantity of dough, such as 1 oz., at the time the continuously advancing piece of dough is discharged from the conveyor D to the reversible conveyor E. The additional quantity of dough is projected onto the piece of dough and when the piece of dough is discharged onto the reversible conveyor E, it meets the prescribed weight requirement. Similarly, the aforementioned application describes in detail this operation of the dough discharge apparatus F in conjunction with the brake 65 and the clutch 64.

If the piece of dough having a correctible weight less than the prescribed weight by an amount within another selected range, such as between 1 oz. and 1½ ozs., the weight classifying circuit 50 activates both of the dough discharge control circuits 60 and 63. The above-described operations are then repeated and the dough discharging apparatus F projects a measured quantity of dough, such as 1½ ozs., onto the continuously advancing piece of dough, when the piece of dough is discharged from the conveyor D to the reversible conveyor E, so that the piece of dough advanced by the reversible conveyor E meets the prescribed weight requirement.

Figures 7, 8:
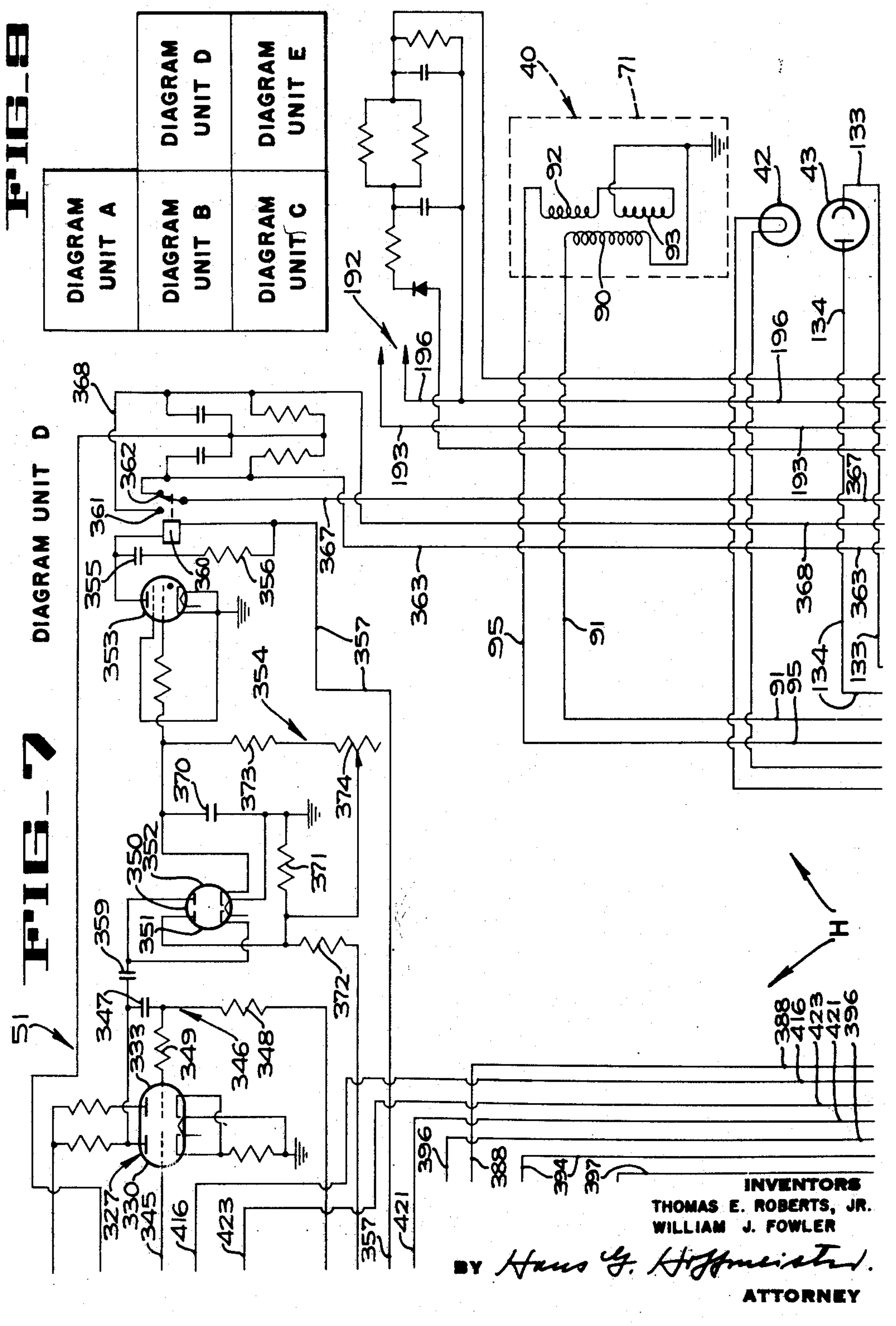

Referring to FIGS. 4–8, the electromechanical transducer 40 of the weight checking apparatus C comprises a suitable oscillator 70 (FIG. 4) and a detector transformer 71 (FIG. 7). The oscillator 70 produces a constant 2 kc. signal and is of the type referred to as a Colpitts oscillator. Included in the oscillator 70 is a triode tube 72 that receives its plate voltage from the positive side of a suitable power supply 73 (FIG. 6) over a conductor 74. The tank circuit for the oscillator 70 comprises inductance coil 75 (FIG. 4) and capacitors 76, 77 and 78. To obtain a desired output voltage, the capacitors 77 and 78 are employed as voltage dividers. A capacitor 79 is provided to prevent direct current from being short circuited through the inductance coil 75, while permitting free passage of the alternating current component of the plate current. Resistors 80 and 81 produce the grid bias from the direct current component of the grid current. Inductance coil 82, capacitor 83 and resistor 84 form a decoupling network to isolate the 2 kc. oscillators from the power supply 73. The output signal of the oscillator 70 is produced across a variable resistor 85.

The oscillator 70 excites the primary winding 90 (FIG. 7) of the detector transformer 71 over a conductor 91. Output windings 92 and 93 of the detector transformer 71 are connected in series opposition and the voltages induced therein are opposite in phase. As fully described in the aforesaid application, the core of the detector transformer 71 is displaced relative to the windings of the detector transformer 71 as the scale of the weight checking apparatus C is deflected. This produces a differential voltage across the output of the secondary windings 92 and 93 which varies linearly with the change in the position of the transformer core. Therefore, the detector transformer 71 detects the magnitude of linear descent of the scale of the weight checking apparatus C and produces a signal indicative of such a magnitude. This is a function of the amount by which the weight of a piece of dough exceeds a predetermined preload value of the scale in the weight checking apparatus C.

Across the secondary windings 92 and 93 of the detector transformer 71 is produced the output signal of the transformer 71, which is representative of the weight of a piece of dough advancing across the weight checking apparatus C. The output signal is fed to the audio amplifier 41 (FIG. 4) over the following path: from ground, winding 93, winding 92, conductor 95, and the input circuit 96 of the audio amplifier 41.

Suitable amplification of the voltage signal transmitted by the detector transformer 71 is provided by the stages 100–102 (FIG. 4) of the amplifier 41, which are connected in cascade. The amplifier stage 102 is a cathode follower, which supplies an output signal to an alternating current recorder, not shown, by way of terminals 103 and 104. In case a direct current recorder, not shown, is employed, it is connected across terminals 103 and 105 so that a suitable rectifier (FIG. 4) is connected between the direct current recorder and the cathode follower 102.

To compensate for nonlinearity in the amplifier 41, a portion of the output signal from the amplifier stage 101 is fed back to the input circuit 96 of the amplifier 41 through a feedback resistor 110 and a conductor 111. The remaining portion of the output signal from the stage 101 of the amplifier 41 is fed to the weight classifying circuit 50 (FIGS. 4–6) and the divider control circuit 45 (FIG. 4).

Figure 6:
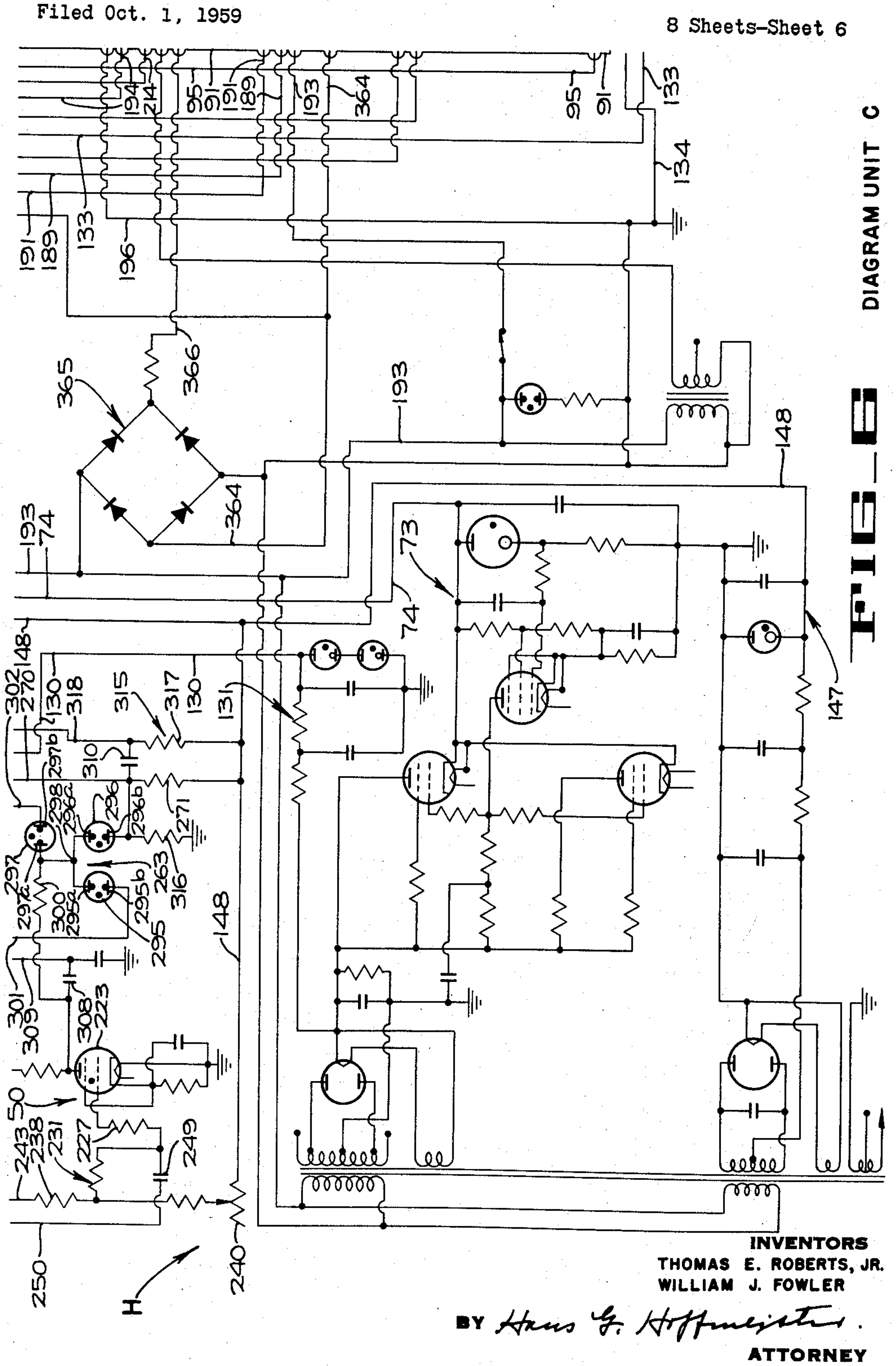

Just before the scale platform of the weighing device C attains maximum deflection, the piece of dough advancing thereacross interrupts a beam of light projected by the source of light 42 (FIG. 7) toward the phototube 43 (FIG. 7). When the beam of light is interrupted, the phototube 43 emits a control signal to the phototube timing circuit 44 (FIG. 4). The timing circuit 44 includes a monostable cathode-coupled multivibrator 115 that comprises triode tubes 116 and 117. The tube 116 of the multivibrator 115 is normally biased to cut-off, while the tube 117 is normally conducting. In the plate circuit of the triode tube 117 is a relay 120. Since the tube 117 is normally conducting, the relay 120 is normally energized over the following path: ground, tube 117, relay 120, conductor 130, and power supply 131 (FIG. 6). The signal emitted by the phototube 43 is impressed on the grid 116a of the tube 116 over the following path: grid 116a, resistor 132, conductor 133, phototube 43, conductor 134, and ground. Said control signal is of sufficient magnitude to cause the triode tube 116 to conduct, thereby rendering the triode tube 117 non-conductive This results in the deenergization of the relay 120. The voltage on the grid 117a of the triode tube 117 begins to rise exponentially toward the plate voltage, as the tube 117 is rendered non-conductive. When the grid-to-cathode voltage on the tube 117 reaches a sufficient magnitude, the tube 117 once again conducts and the tube 116 is rendered non-conductive. The interval of time it takes for the triode tube 117 to return to its initial energized state is dependent upon the time constant of a variable resistor 135, a resistor 135a, and a capacitor 136. The variable resistor 135 is adjusted so that the time interval for returning the triode tube from the non-conducting state to its conducting state is at least as great as the time it takes for a piece of dough on the conveyor of the weighing apparatus C to advance a distance equal to the length of the longest anticipated piece of dough. In this manner, the timing operation of the phototube timing circuit 44 is independent of the length of a weighed article.

From the foregoing, it is to be observed that the normally energized relay 120 of the phototube timing circuit 44 is deenergized at the time a piece of dough advancing across the weighing device C interrupts the beam of light projected toward the phototube 43 and returns to its initial energized state after a fixed time interval has elapsed.

Figure 4:
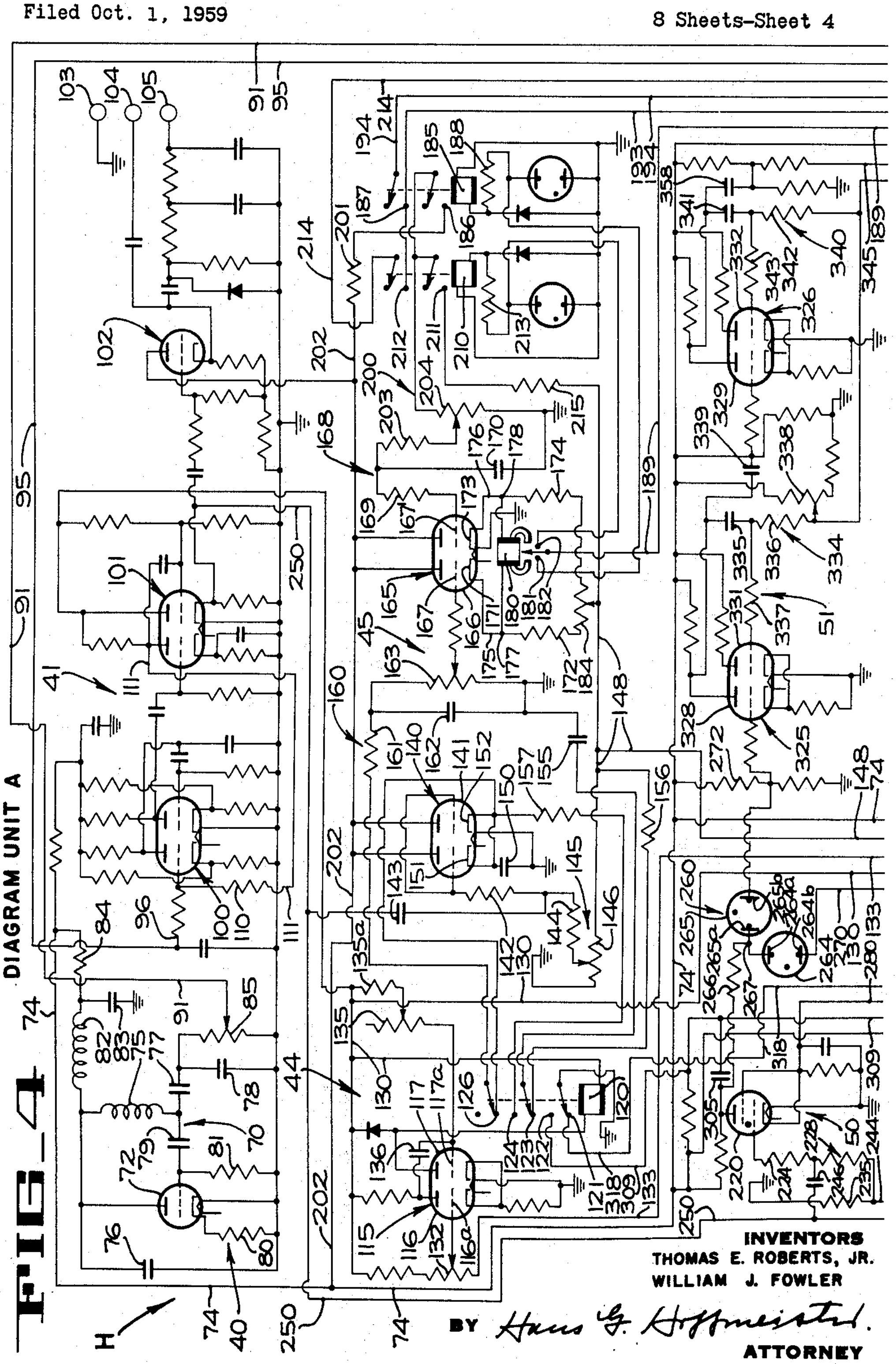

As shown in FIG. 4, the divider control circuit 45 comprises a detector 140, which includes a duo-triode tube 141. The grids of the tube 141 are connected to a grid resistor 142, which is connected to the output of the audio amplifier 41 through a blocking capacitor 143. Thus, the successive voltage signals that are respectively representative of the weight of pieces of dough advancing across the weight checking apparatus C are transmitted by the audio amplifier 41 to the detector 140 of the divider control circuit 45.

An adjustable biasing network 145 of the divider control circuit 45 is also connected to the grid resistor 142 of the detector 140 and includes a resistor 144 and a potentiometer 146. One end of the resistor 144 is connected to the grid resistor 142, while the other end of the resistor 144 is connected to the adjustable contact of the potentiometer 146. The potentiometer 146 at one end is connected to ground and at the other end, the potentiometer 146 is connected to the negative side of a power supply 147 (FIG. 6) over a conductor 148. By means of this biasing arrangement, the detector 140 conducts in response to the peak portions of the aforementioned voltage signals that are transmitted by the amplifier 41.

In the cathode circuit of the detector 140 (FIG. 4) is a capacitor 150 that is connected at one end to the cathodes 151 and 152 of the duo-triode tube 141 and has its other end connected to ground. The capacitor 150 charges positively as the detector 140 conducts, and the detector 140 conducts in response to the portion of voltage signal, transmitted by the amplifier 41, that overcomes the biasing potential applied to the grid resistor 142 of the detector circuit 140 by the biasing network 145.

The relay 120 of the phototube timing circuit 44 is normally energized. At that time, contacts 123 of relay 120 are closed to charge a capacitor 155 to a predetermined negative potential over the following path: ground, capacitor 155, contacts 123, resistor 156, conductor 148 and the negative side of the power supply 147. Upon the deenergizing of the relay 120, contacts 123 break to open the charging circuit for the capacitor 155 and contacts 124 close to complete a discharging circuit for the capacitor 155 over the following path: ground, capacitor 155, contacts 124, resistor 157, capacitor 150 and ground. Consequently, the capacitor 155 discharges to charge the capacitor 150 to a negative reference potential of a predetermined magnitude.

As previously described, the relay 120 is deenergized just before the scale of the weight checking apparatus C attains maximum deflection from the weight of the piece of dough imposed thereon. Therefore, the capacitor 150 of the detector 140 is charged by the capacitor 155 to the negative reference potential just prior to the time the detector 140 receives a voltage signal representative of the weight of the piece of dough advancing across a weight checking apparatus C. When the detector 140 receives the just-mentioned voltage signal, it conducts. The conduction of the detector 140 reduces the negative potential on the capacitor 150 and may charge the capacitor 150 positively dependent upon the difference between the magnitude of the voltage signal and the biasing potential on the detector 140. The biasing network 145 is adjusted so that the charge remaining on the capacitor 150 is zero when the detector 140 conducts in response to a voltage signal representative of the weight of a piece of dough of a desired weight. The term "desired weight" is used to indicate the weight desired for each piece of dough leaving the dough divider A. It is not the final or prescribed weight. The desired weight is greater than the predetermined minimum weight but may be less than the prescribed weight so that there will be a minimum number of pieces of dough that are overweight or weigh in excess of the prescribed weight. If an incoming voltage signal is representative of the weight of a piece of dough weighing more than the desired weight, the charge remaining on the capacitor 150 will be positive. In case an incoming voltage signal is representative of the weight of a piece of dough weighing less than the desired weight, the charge remaining on the capacitor 150 will be negative.

When the relay 120 is again energized after a predetermined time interval has elapsed, contacts 124 break to disconnect the capacitor 150 of the detector 140 from the capacitor 155 and contacts 123 close to complete the charging circuit for the capacitor 155. In addition, the return of the relay 120 to its normal energized state closes relay contacts 126 to establish a circuit for transmitting the voltage pulse from the voltage remaining on the capacitor 150 of the detector 140 to an averaging network 160 (FIG. 4). The voltage pulse is representative of the difference between the desired weight for pieces of dough leaving the dough divider and the weight of the piece of dough advancing across the weight checking apparatus C. The above operations occur each time a piece of dough is weighed by the weight checking apparatus C. Accordingly, the detector 140 converts the successive voltage signals transmitted by the amplifier 41 into a series of pulses, respectively representative of the difference between the desired weight and the weight of pieces of dough advancing in succession across the weight checking apparatus C.

The series of pulses are received by the averaging network 160 of the divider control circuit 45 which comprises a resistor 161, a capacitor 162 and a potentiometer 163. The average network 160, which has a relatively long time constant compared to the time duration between the successive pulses, averages the series of pulses received from the detector 140 and transmits an average signal to a differential detector 165 (FIG. 4) of the divider control circuit 45. It is to be observed that the average signal produced by the averaging network 160 is not the result of a finite series of pulses, but is a continuous signal reflecting an average of a series of pulses that is continuously produced by the detector 140.

The differential detector 165 comprises a duo-triode tube 166 that has its grid 167 connected to the adjustable connection of the potentiometer 163 and the averaging network 160 for receiving therefrom an average signal. Another grid 167' of the duo-triode 166 is connected to a biasing network 168, which includes a resistor 169 and a capacitor 170, for impressing onto the grid 167' a reference voltage. In the prefered embodiment, the reference voltage impressed on the grid 167' of the duo-triode tube 166 by the biasing network 168 is zero.

A cathode 171 of the duo-triode tube 166 is connected to a resistor 172 which is connected to the negative side of the power supply 147 (FIG. 6) through the conductor 148. Likewise, the other cathode 173 of the duo-triode 166 is connected to a resistor 174, which is connected to the negative side of the power supply 147 through the conductor 148. The resistors 172 and 174 have the same resistance values and, hence, cathode circuits 175 and 176 of the differential detector 165 are balanced. Interconnecting the cathode circuits 175 and 176 of the differential detector 165 at junctions 177 and 178 is a polarized relay 180. Connected in parallel with the polarized relay 180 is a variable resistor 184 that is adjustable for regulating the sensitivity of the polarized relay 180.

When the average signal produced by the averaging network 160 has a magnitude representative of the desired weight for pieces of dough leaving the dough divider A, the voltage applied to the grid 167 of the differential detector 165 by the averaging network 160 is zero. Since the reference voltage applied to the grid 167' of the differential detector 165 by the biasing network 168 is zero, each tube section of the duo-triode tube 166 has a current flow of equal magnitude. Hence, the current flow of each cathode circuit 175 and 176 of the differential detector 165 has a current flow of equal magnitude. Consequently, the potential difference between the junctions 177 and 178 is zero and the polarized relay 180 remains deenergized.

In case an average signal produced by the averaging network 160 has a positive magnitude, which is representative of an average weight in excess of the desired weight, the voltage applied to the grid 167 of the differential detector 165 is more positive than the reference potential applied to the grid 167' of the differential detector 165. As a consequence, thereof, the tube section of the duo-triode tube 166 controlled by the grid 167 conducts more current than the tube section of the duo-triode tube 166 controlled by the grid 167'. Therefore, there is a greater current flow in the cathode circuit 175 than is present in the cathode circuit 176. This results in a potential difference between the junctions 177 and 178 to cause the polarized relay 180 to operate. The operation of the polarized relay 180, under the above described conditions, closes contacts 181 to complete an energizing circuit for a divider control relay 185 (FIG. 4) over the following path: ground, relay 185, resistor 188, contacts 181, conductor 189, microswitch 190, conductor 191, conductor 74 and the positive side of the power supply 73 (FIG. 6). Upon energizing the relay 185, contacts 186 and 187 close. The closing of the contacts 187 completes an operating circuit for the divider control motor 46 (FIG. 8) over the following path: One side of the source of alternating current 192, (FIG. 7) conductor 193, contacts 187, conductor 194, motor 46 (FIG. 8), conductor 195, conductor 196 and the other side of the alternating current source 192. Accordingly the reversible motor 46 is operated so that its drive shaft rotates in a direction to decrease the weight of pieces of dough formed within the dough divider A whenever the average signal produced by the averaging network 168 indicates that the pieces of dough passing over the weight checking apparatus C is in excess of the desired weight for pieces of dough leaving the dough divider A.

The closing of the contacts 186 of the relay 185 completes a circuit to apply a fixed positive potential to a bias control network 200 (FIG. 4) over the following path: ground, bias control network 200, contacts 186, resistor 201, conductor 202, conductor 74, and positive side of the power supply 73 (FIG. 6). The bias control network 200 includes a resistor 203 and a potentiometer 204, which are connected in parallel with the capacitor 170 of the biasing network 168.

The capacitor 170 of the biasing network 168 charges slowly toward the positive voltage of the bias control network 200 and applies a gradually increased positive potential to the grid 167′ of the differential detector 165 through the resistor 169 until the positive potential on the grid 167′ is equal to the positive potential on the grid 167, which is impressed thereon by the averaging network 160. When the potential of the grid 167′ is equal to the potential on the grid 167, each tube section of the differential detector 165 has a current flow of equal magnitude. Therefore, the current flow in each of the cathode circuits 175 and 176 of the differential detector 165 is of equal magnitude. As a result thereof, the potential differences between the junctions 177 and 178 is zero and the polarized relay 180 is deenergized.

When the polarized relay 180 is deenergized, contacts 181 break to release the divider control relay 185. When the relay 185 is deenergized, contacts 187 break to open the operating circuit for the divider control motor 46 and the contacts 186 break to disconnect the bias control network 200 from the fixed positive potential. The capacitor 170 of the biasing network 168 then discharges to the aforementioned reference voltage, which is zero. From the foregoing it is to be observed that the differential detector 165 compares the polarity of an average signal with a reference voltage to determine the direction of rotation of the reversible motor 46 and compares the magnitude of the average signal with a gradually increased reference voltage of a like polarity to determine the time duration for operating the reversible motor 46. The length of time that the divider control motor 46 operates, which determines the angular displacement of its drive shaft, can be regulated by the potentiometer 204 of the bias control network 200. Accordingly, the dough dividing machine A is regulated to decrease the weight of pieces of dough formed therein to compensate for an over weight variation between the desired and the average weight of pieces of dough advancing in succession across the weight checking apparatus C.

If an average signal produced by the averaging network 168 has a negative magnitude, which is representative of an average weight less than the desired weight, the voltage applied to the grid 167 of the differential detector 165 is more negative than the reference voltage applied to the grid 167′ by the biasing network 168. As a consequence thereof, the tube section of the duo-triode tube 166 controlled by the grid 167′ conducts more current than the tube section of the duo-triode tube 166 controlled by the grid 167. Therefore, there is greater current flow in the cathode circuit 176 than is present in the cathode circuit 175. This results in a potential difference between the junctions 177 and 178 to cause the polarized relay 180 to operate. The operation of the polarized relay 180, under the just-described conditions, closes contacts 182 to complete an energizing circuit for a divider control relay 210 (FIG. 4) over the following path: ground, relay 210, resistor 213, contacts 182, conductor 189, microswitch 190, conductor 191, conductor 74 and the positive side of the power supply 73 (FIG. 6).

When the divider control relay 210 is energized, contacts 211 and 212 close. The closing of the contacts 212 complete an operating circuit for the divider control motor 46 (FIG. 8) over the following path: one side of the source of alternating current 192 (FIG. 7), conductor 193, contacts 212, conductor 214, motor 46, conductor 195, conductor 196 and the other side of the source of alternating current 192. Accordingly, the reversible motor 46 is operated so that its drive shaft rotates in a direction to increase the weight of pieces of dough formed within the dough divider A, if the average weight of pieces of dough passing over the weight checking apparatus C is less than the desired weight for pieces being discharged from the dough divider A.

The closing of contacts 211 completes a circuit to apply a fixed negative potential to the bias control network 200 (FIG. 4) over the following path: ground, potentiometer 204, contacts 211, resistor 215, conductor 148 and the negative side of the power supply 147 (FIG. 6). The capacitor 170 of the biasing network 168 charges slowly toward the negative voltage on the bias control network 200 and impresses a gradually more negative potential on the grid 167′ of the differential detector 165 through the resistor 169 until the negative potential on the grid 167′ is equal to the magnitude of the negative potential on the grid 167, which is impressed thereon by the averaging network 160. When the potential on the grid 167′ is equal to the potential on the grid 167, each tube section of the differential detector 165 has a current flow of equal magnitude. Therefore, each of the cathode circuits 175 and 176 has a current flow of equal magnitude. As a result thereof, the potential difference between the junctions 177 and 178 is zero and the polarized relay 180 is deenergized.

Upon deenergizing the polarized relay 180, the contacts 182 break to release the divider control relay 210. When the relay 210 is deenergized, contacts 212 break to open the operating circuit for the divider control motor 46 and contacts 211 break to disconnect the bias control network 200 from the fixed negative potential. The capacitor 170 of the biasing network 168 then discharges to the aforementioned reference voltage, which is zero. The time duration for operating the divider control motor 46 and, hence, the angular displacement of the drive shaft of the motor 46 is controlled by the magnitude of the average signal impressed on the grid 167 of the differential detector 165 and the gradually increased negative voltage impressed upon the grid 167′ by the bias control network 200 through the capacitor 170. Therefore the differential detector 165 compares the polarity of the average signal with a reference voltage to determine the direction of rotation of the reversible motor 46, and compares the magnitude of the average signal with the gradually changing reference voltage of a like polarity to determine the time duration for operating the reversible motor 46. In this manner the dough divider A is regulated to increase the weight of pieces of dough formed therein to compensate for an underweight variation between the desired weight and the average weight of pieces of dough advancing in succession across the weight checking apparatus C.

The above described operations for compensating for variations between the desired weight and an average weight is repeated until the pieces of dough advancing across the weight checking apparatus C are of the desired weight. When this occurs, the average signal applied to the grid 167 of the differential detector 165 between the averaging network 160 is equal to the reference voltage applied to the grid 167′ of the differential detector 165 by the biasing network 168.

Figure 5:
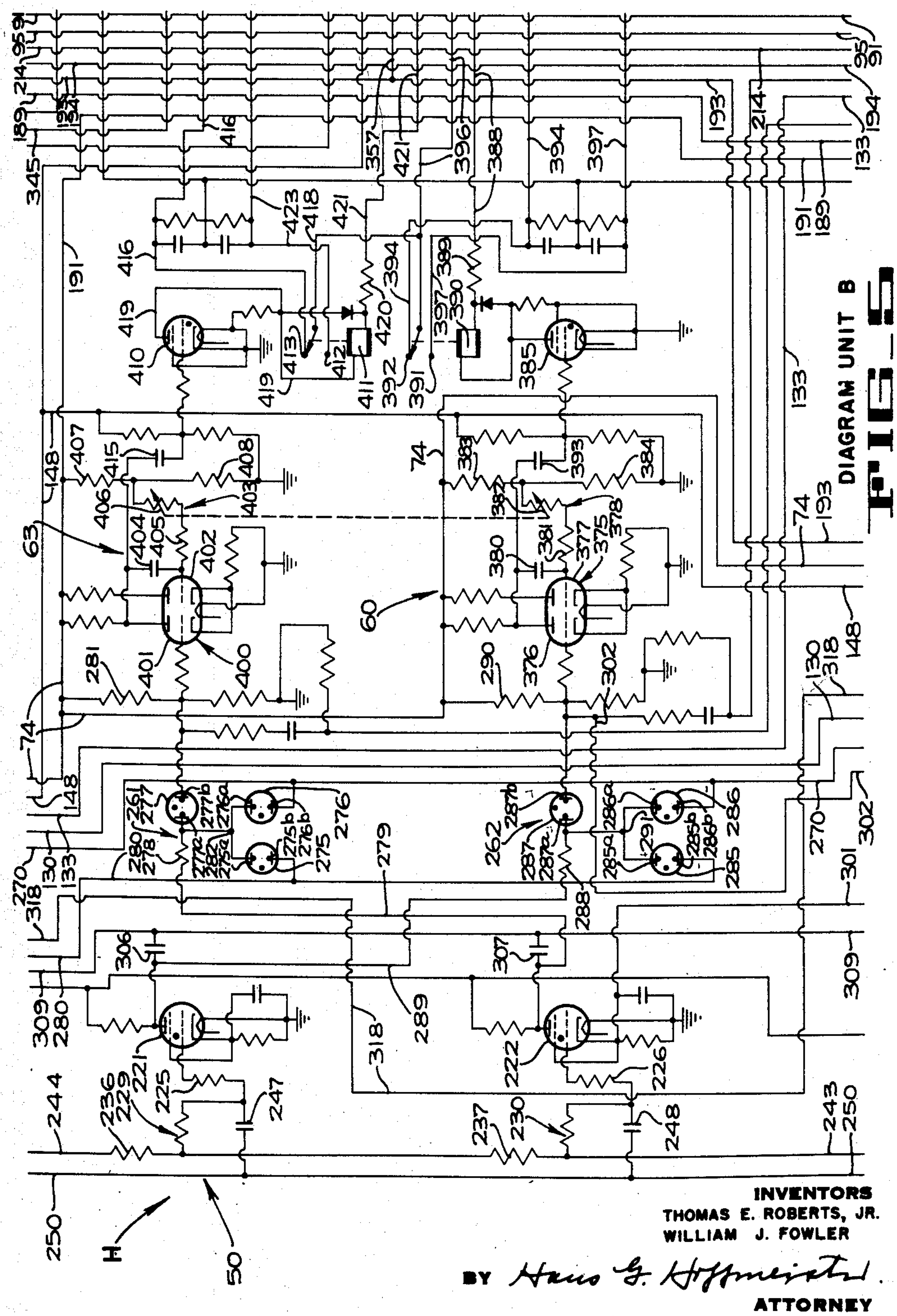

Illustrated in FIGS. 4–6 is the weight classifying circuit 50 of the electronic control circuits H which comprises four thyratron tubes 220–223. The thyratron tubes 220–223 have their grid resistors 224–227 connected to biasing networks 228–231, respectively. Included in the biasing networks 228–231 are serially connected resistors 235–238, respectively. The resistors 235–238 may be in the form of potentiometers for adjusting the bias on the thyratron tubes 220–223, respectively. A negative voltage is applied to the resistors 235–238 by way of the following path: the negative side of the power supply 147 (FIG. 6), conductor 148, potentiometer 240, resistor 238, conductor 243, resistor 237, resistor 236, conductor 244, resistor 235, and ground. From this arrangement, the thyratron tubes 220–223 are progressively biased in their numerical order, whereby each succeeding thyratron tube has a more negative bias impressed on the grid resistor thereof than does the preceding thyratron tube.

The grid resistors 224–227 of the thyratron tubes 220–223, respectively, are coupled to the output stage 101 of the audio amplifier 41 by means of blocking capacitors 246–249, respectively, and a conductor 250. Over the conductor 250 are transmitted the successive positive signals from the audio amplifier 41 that are respectively representative of the weight of pieces of dough advancing in succession across the weight checking apparatus C. The biasing networks 228–231 are arranged to control the firing of the thyratron tubes 220–223 in the following manner:

*a.* thyratron tubes 220–223 do not fire when a voltage signal transmitted by the audio amplifier 41 is representative of the weight of a piece of dough weighing less than the predetermined minimum weight;

*b.* thyratron tube 220 conducts when a voltage signal transmitted by the audio amplifier 41 is representative of the weight of a piece of dough weighing less than the prescribed weight within a selected range, such as between 1½ ozs. and 1 oz.;

*c.* thyratron tubes 220 and 221 fire when a voltage signal transmitted by the audio amplifier 41 is representative of the weight of a piece of dough weighing less than a prescribed weight within another selected range, such as between one oz. and one-half oz.;

*d.* thyratron tubes 220–222 conduit when a voltage signal transmitted by the audio amplifier 41 is representative of the weight of a piece of dough weighing less than the prescribed weight by an amount not in excess of a predetermined quantity such as ½ oz.;

*e.* thyratron tubes 220–223 fire when a voltage signal transmitted by the audio amplifier 41 is representative of the weight of a piece of dough weighing at least the prescribed weight.

For controlling the operation of the reject control circuit 51 (FIGS. 4 and 7), the dough discharge control circuit 60 (FIG. 5) and the dough discharge circuit 63 (FIG. 5) in response to the conduction of the thyratron tubes 220–223, the weight classifying circuit 60 includes four logic circuits, such as neon logic circuits 260–263 (FIGS. 4–6). The logic circuit 260 (FIG. 4) comprises gas-filled voltage regulating tubes in the form of neon tubes 264 and 265. The electrodes 264*a* and 265*a* of the neon tubes 264 and 265, respectively, are connected at a junction 267, which is connected to the plate of the thyratron tube 220 through a limiting resistor 266. The other electrode 264*b* of the neon tube 264 is connected to the negative side of the power supply 147 by way of a conductor 270, resistor 271 and conductor 148. The electrode 265*b* of the neon tube 265 has a fixed positive potential impressed thereon over a path including the positive side of the power supply 73, conductor 74 and a resistor 272. In addition, the electrode 265*b* of the neon tube 265 is connected to the reject control circuit 51. When the neon tube 265 is fired, a voltage pulse is produced for activating the reject control circuit 51.

The logic circuit 261 (FIG. 5) comprises gas-filled voltage regulating tubes in the form of neon tubes 275, 276 and 277. The electrodes 275*a*, 276*a* and 277*a* of the neon tubes 275, 276, and 277, respectively, are connected at a junction 282, which is connected to the plate of the thyratron tube 222 by way of a limiting resistor 278 and over a conductor 279. As shown in FIGS. 4 and 5, the other electrode 275*b* of the neon tube 275 is connected to the cathode of the thyratron tube 220 over a conductor 280. The electrode 276*b* of the neon tube 276 is connected to the negative side of the power supply 147 by way of the conductor 270, resistor 271 and conductor 148. The electrode 277*b* of the neon tube 277 has a fixed positive potential impressed thereon over a path including the positive side of the power supply 73, conductor 74, resistor 281. Further, the electrode 277*b* of the neon tube 277 is connected to the dough discharge control circuit 63. When the neon tube 277 is fired, a voltage pulse is produced for activating the dough discharge control circuit 63.

In FIG. 5 is shown the logic circuit 262 which comprises gas-filled voltage regulating tubes in the form of neon tubes 285, 286 and 287. The electrodes 285*a*, 286*a*, 287*a* of the neon tubes 285, 286 and 287, respectively, are connected at a junction 291, which is connected to the plate of the thyratron 221 through a limiting resistor 288 and over a conductor 289. The electrode 285*b* of the neon tube 285 is connected to the cathode of the thyratron tube 220 by way of the conductor 280. The electrode 286*b* of the neon tube 286 is connected to the negative side of the power supply 147 over the path including the conductor 270, resistor 271 and conductor 148. The other electrode 287*b* of the neon tube 287 has a fixed positive potential impressed thereon over a path including the positive side of the power supply 73, the conductor 74 and a resistor 290. In addition, the electrode 287*b* of the neon tube 287 is connected to the dough discharge control circuit 60. When the neon tube 287 is fired, a voltage pulse is produced for activating the dough discharge control circuit 60.

Illustrated in FIG. 6 is the logic circuit 263, which includes gas-filled voltage regulating tubes in the form of neon tubes 295, 296 and 297. The electrodes 295*a*, 296*a*, and 297*a* of the neon tubes 295, 296 and 297, respectively, are connected at a junction 298, which is connected to the plate of the thyratron tube 223 through a limiting resistor 300. The electrode 295*b* of the neon tube 295 is connected to the cathode of the thyratron 222 over a conductor 301. The electrode 296*b* of the neon tube 296 is connected to the negative side of the power supply 147 over the path including the resistor 271 and the conductor 148. The electrode 297*b* of the neon tube 297 has a fixed positive potential applied thereto over a path including the positive side of the power supply 73, conductor 74, resistor 290 and a conductor 302. Further, the electrode 297*b* of the neon tube 297 is connected to the dough discharge control circuit 60 over the just-mentioned path. When the neon tube 297 is fired, a voltage pulse is produced for activating the dough discharge control circuit 60.

As previously described in connection with the divider control circuit 45, the relay 120 (FIG. 4) of the phototube timing circuit 44 is normally energized. At that time contacts 121 are closed and the contacts 122 are opened. Connected to the plate of the thyratron tubes 220–223 are capacitors 305–308, respectively, which are also connected to the positive side of the power supply 73 over conductors 309 and 74. When the contacts 122 are opened, the capacitors 305–308 are charged to approximately plate potential. The relay 120 is deenergized when the beam of light projected toward the phototube 43 is interrupted by a piece of dough advancing across the check weighing apparatus C. The beam of light is interrupted just before the scale of the weight checking apparatus C attains maximum deflection from the weight of a piece of dough imposed thereon. The relay 120 remains deenergized for a predetermined period of time in a manner previously described in detail.

When the relay 120 is deenergized, the contacts 121 open and the contacts 122 close. The closing of the contacts 122 places a ground on the conductor 309 which causes the capacitors 305–308 to discharge instantaneously. This results in a sharp negative pulse appearing on the plates of the thyratron tubes 220–223. Consequently, any thyratron tube that may be conducting will be extinguished and the thyratron tubes 220–223 are thereby conditioned to receive an incoming signal from the amplifier 41 for classifying by weight the piece of dough advancing across the weight checking apparatus C. When the thyratron tubes 220–223 are conditioned for receiving an incoming signal from the audio amplifier 41, the potentials on the current limiting resistors 266, 278, 288, and 300 are at approximately plate potential.

After a predetermined time interval has elapsed, the relay 120 is returned to its normally energized state to close contacts 121 and to open contacts 122. While the contacts 121 were opened, a capacitor 310 (FIG. 6) of a pulse forming network 315 was charged over the following path: ground, capacitor 310, resistor 317, conductor 148, and the negative side of the power supply 147. The pulse forming network 315 comprises a resistor 316, the resistor 271, the capacitor 310 and a resistor 317. When the contacts 121 close, the junction between the capacitor 310 and the resistor 317 is grounded over the following path: ground, contact 121, and conductor 318. As a consequence thereof, the capacitor 310 is discharged and a positive pulse is formed by the pulse forming network 315. The positive pulse appears at the junction of the resistor 271, the resistor 316 and the capacitor 310. Said junction is connected to the electrodes **264*b*, 276*b*, 286*b*, and 296*b* of the neon tubes 264, 276, 286, and 296**, respectively.

The operation of the weight classifying circuit 50 will now be described. When a piece of dough advancing across the weight checking apparatus C interrupts the beam of light projected toward the phototube 43, the relay 120 (FIG. 4) of the phototube timing circuit 44 is deenergized. This occurs just before the scale of the weight checking apparatus C attains maximum deflection. The deenergization of the relay 120 causes contacts 122 to close, which results in the instantaneous discharge of the capacitors 305–308 (FIGS. 4–6) to extinguish any thyratron that may be conducting. Accordingly, the thyratrons 220–223 are prepared to receive the incoming signal from the amplifier 41.

If the incoming signal is representative of the weight of a piece of dough weighing less than the predetermined minimum weight, the magnitude of the incoming signal is insufficient to overcome the bias on the thyratron tubes 220–223 (FIGS. 4–6) and these tubes remain nonconductive. Hence, the potentials appearing at the plates of the thyratron tubes 220–223 are at a maximum and the potentials appearing at the cathodes of the thyratron tubes 220–223 are zero volts.

In the neon logic circuit 260 (FIG. 4), the electrodes **264*a* and 265*a* of the neon tubes 264 and 265, respectively, are connected to the junction 267, which, in turn, is connected to the plate of the thyratron tube 220. Hence, maximum potentials appear on the electrodes 264*a* and 265*a*. The electrode 265*b* of the neon tube 265 has a positive potential appearing thereon. The voltage difference between the electrodes of the neon tube 265 is insufficient, at this time, to cause the neon tube 265 to fire. However, impressed on the electrode 264*b* of the neon tube 264 is a negative voltage and the potential difference between the electrodes of the neon tube 264 is sufficient to cause it to fire. When the neon tube 264 conducts, it reduces the positive potential on the electrode 265*a* of the neon tube 265 to further reduce the tendency of the neon tube 265** to conduct.

As to the logic circuit 261 (FIG. 5) the electrodes **275*a*, 276*a*, and 277*a* of the neon tubes 275–277, respectively, are connected to the junction 282, which, in turn, is connected to the plate of the thyratron tube 222. Thus, maximum potentials are impressed on the electrodes 275*a*–277*a* of the neon tubes 275–277, respectively. The electrode 277*b* of the neon tube 277 has a positive potential impressed thereon and the potential difference between the electrodes of the neon tube 277 is insufficient to cause this tube to fire. Since the electrode 275*b* of the neon tube 275 is connected to the cathode of the thyratron tube 220, zero volts appear thereon. The potential difference between the electrodes of the neon tube 275 is insufficient to cause this tube to conduct. However, the electrode 276*b* of the neon tube 276 has a negative voltage appearing thereon and the potential difference between the electrodes of the neon tube 276 is sufficient to cause this tube to fire. The conduction of the tube 276 reduces the potential at the junction 282, thereby reducing the tendency of the neon tube 275 and 277** to conduct.

With regard to the logic circuit 262 (FIG. 5), the electrodes **285*a*–287*a* of the neon tubes 285–287, respectively, are connected to the junction 291 which, in turn, is connected to the plate of the thyratron tube 221. Therefore, maximum potentials are impressed on the electrodes 285*a*–287*a* of the neon tubes 285–287 respectively. The electrode 287*b* of the neon tube 287 has a positive potential appearing thereon, and the potential difference between the electrodes of the neon tube 287 is insufficient to cause this tube to conduct. The electrode 285*b* of the neon tube 285 is connected to the cathode of the thyratron tube 220 and, hence, zero volts are impressed thereon. The potential difference between the electrodes of the neon tube 285 is insufficient to fire this tube. However, the electrode 286*b* of the neon tube 286 has a negative potential appearing thereon and, thus, the potential difference between the electrodes 286 is sufficient to cause this tube to fire. The conduction of the tube 286 reduces the positive potential at the junction 291, thereby further reducing the tendency of the neon tubes 285 and 287** to fire.

In the logic circuit 263 (FIG. 6), the electrodes **295*a*–297*a* of the neon tubes 295–297, respectively, are connected to the junction 298, which, in turn, is connected to the plate of the thyratron tube 223. Hence, maximum positive potentials appear on the electrodes 295*a*–297*a*. The electrode 297*b* of the neon tube 297 has a positive voltage appearing thereon and the potential difference between the electrodes of the neon tube 297 is insufficient to cause this tube to fire. The electrode 295*b* of the neon tube 295 is connected to the cathode of the thyratron 222 and, hence, has zero volts impressed thereon. The potential difference between the electrodes of the neon tubes 295 is sufficient to cause this tube to fire. However, the electrode 296*b* of tube 296 has a negative potential appearing thereon and thus the potential difference between the electrodes is sufficient to cause tube 296 to fire. Accordingly, tubes 264, 276, 286, and 296 of the logic circuits 260–263**, respectively, are conducting.

After a predetermined timed interval has elapsed, the relay 120 is returned to its initial energized state to close contacts 121 and to open contacts 122. The closing of the contacts 121 places a ground on the conductor 318 to discharge the capacitor 310, thereby causing the pulse forming network 315 (FIG. 6) to impress on the electrodes **264*b*, 276*b*, 286*b*, and 296*b* of the neon tubes 264, 276, 286, and 296, respectively, a positive pulse. Since the neon tubes 264, 276, 286, and 296, are conducting, they tend to keep a constant voltage across their respective electrodes. Consequently, the positive pulse causes increases of positive potentials on the electrodes 264*a*, 276*a*, 286*a* and 296*a* of the neon tubes 264, 276, 286, and 296, respectively. Hence, increased positive potentials are present at the junctions 267, 282, 291 and 298 of the logic circuits 260, 263**, respectively.

The increase in positive potential at the junction 267 of the logic circuit 260 (FIG. 4) impresses an increased positive potential on the electrode **265*a* on the neon tube 265. As a consequence thereof, the potential difference between the electrodes of the neon tube 265 is sufficient to cause this tube to fire. When the neon tube 265 is fired, a voltage pulse is produced for activating the reject control circuit 51**.

The increase of positive potential at the junction 282 of the logic circuit 261 (FIG. 5) increases the positive potential appearing on the electrode **275*a* of the neon tube 275. Since the electrode 275*b* has zero volts impressed thereon, the potential difference between the electrodes of the neon tube 275 is sufficient to cause this tube to conduct. When the neon tube 275 conduits, it reduces the positive potential at the junction 282, thereby reducing the positive potential on the electrode 277***a* of the neon tube 277. The potential difference between the electrodes of the neon tube 277 is insufficient to cause this tube to fire. Consequently, the dough discharge control circuit 63 is not activated.

The increase in positive potential at the junction 291 of the logic circuit 262 (FIG. 5) results in an increase of positive potential on the electrode 285*a* of the neon tube 285. Since the electrode 285*b* of the neon tube 285 has zero volts impressed thereon, the potential difference between the electrodes of the neon tube 285 is sufficient to cause this tube to conduct. When the neon tube 285 conducts, it reduces the positive potential appearing on the electrode 287*a* of the neon tube 287. Accordingly, the potential difference between the electrodes of the neon tube 287 is insufficient to cause this tube to fire. As a consequence, thereof, the dough discharge control circuit 60 is not activated.

The increase in positive potential at the junction 298 of the logic circuit 263 (FIG. 6) causes an increase in positive potential on the electrode 295*a* of the neon tube 295. The electrode 295*b* of the neon tube 295 is connected to the cathode of the thyratron tube 222 and has zero volts impressed thereon. Thus, the potential difference between the electrodes of the neon tube 295 is sufficient to cause the neon tube 295 to fire. The conduction of the neon tube 295 reduces the positive potential at the junction 298, thereby reducing the positive potential appearing on the electrode 297*a* of the neon tube 297. Therefore, the potential difference between the electrodes of the neon tube is insufficient to cause this tube to fire. Thus, the dough discharge control circuit 60 is not activated. After the capacitor 310 of the pulse forming circuit 315 has been discharged, the neon tubes 265, 275, 285, and 295 will be extinguished.

When a succeeding piece of dough advances across the weight checking apparatus C, it interrupts the beam of light projected toward the phototube 43. Thereupon, the relay 120 (FIG. 4) of the phototube timing circuit 44 is deenergized. This occurs just before the weight checking apparatus C attains maximum deflection. The deenergization of the relay 120 closes contacts 122 and opens contacts 121. The closing of the contacts 122 results in the instantaneous discharge of the capacitors 305–308 to extinguish any thyratron that may be conducting. The thyratron tubes 220–223 (FIGS. 4–6) are prepared to receive another incoming signal from the audio amplifier 41. The opening of the contacts 121 removes the ground from the pulse forming circuit 315 and thereby enables the capacitor 310 to be charged once again.

In case the incoming signal is representative of the weight of a piece of dough weighing less than the prescribed weight by an amount within a selected range, such as between 1½ ozs. and 1 oz., the magnitude of the incoming signal is sufficient to overcome the bias on the thyratron tube 220 to cause this tube to conduct. The thyratron tubes 221–223 remain non-conductive, since the magnitude of the incoming signal is insufficient to overcome the bias thereon. Hence, the potential appearing on the plate of thyratron tube 220 is reduced and the voltage appearing on the cathode at the thyratron 220 is increased positively from zero volts. The voltages appearing on the plates of the thyratron tubes 221–223 are at a maximum and the potentials appearing on the cathode of the thyratron tubes 221–223 are zero volts.

The neon tubes 276, 286, and 296 of the logic circuits 261–263, respectively, are conductive in the manner above-described. Although the potential on the plate of the conducting thyratron tube 220 is reduced, the potential on the electrode 264*a* of the neon tube 264 is sufficiently high so that the potential difference between the electrodes of the neon tube 264 is sufficient for this tube to conduct. When the neon tube 264 conducts, it reduces the positive potential on the electrode 265*a* of the neon tube 265. In like manner, the conduction of the neon tubes 277, 287, and 297 reduces the positive potentials at the junctions 282, 291 and 298, respectively.

After a predetermined time interval has elapsed, the relay 120 of the phototube timing circuit 44 is returned to its initial energized state. Thereupon, contacts 122 open and contacts 121 close. The closing of contacts 121 causes the pulse forming network 315 to impress on the electrodes 264*b*, 276*b*, 286*b*, and 296*b* of the neon tubes 264, 276, 286, and 296, respectively, a positive pulse. Since the neon tubes 264, 276, 286 and 296 are conducting, they tend to keep a constant voltage across their respective electrodes. This results in increases of positive potentials on the electrodes 264*a*, 276*a*, 286*a* and 296*a* of the neon tubes 264, 276, 286, and 296, respectively. Consequently, there is present increased positive potentials at the junctions 267, 282, 291 and 298 of the logic circuits 260–263, respectively.

As previously described, the conduction of the thyratron tube 220 reduces the positive potential appearing at the junction 267 of the logic circuit 260. Although the positive pulse formed by the pulse forming network 315 increases the positive potential at the junction 267, the voltage difference between the electrodes of the neon tube 265 (FIG. 4) is insufficient to cause this tube to conduct. Therefore, the reject control circuit 51 is not activated.

The electrode 275*b* of the neon tube 275 (FIG. 5) in the logic circuit 261 is connected to the cathode of the conducting thyratron tube 220 (FIG. 4) and the potential appearing thereon has increased positively from zero volts. Although the potential at the junction 282 has increased positively, the potential difference between the electrodes of the neon tube 275 is insufficient to cause this tube to fire. However, the increase of positive potential at the junction 282 increases the positive potential on the electrode 277*a* of the neon tube 277 sufficiently so that the potential difference between the electrodes of the neon tube 277 is adequate to cause the neon tube 277 to fire. When the neon tube 277 fires, a voltage pulse is produced for activating the dough discharge control circuit 63.

In the logic circuit 262, the electrode 285*b* of the neon tube 285 is connected to the cathode of the conducting thyratron tube 220. The potential appearing on the electrode 285*b* of the neon tube 285 has increased positively from zero volts. While the potential at the junction 291 has increased, the increased positive potential on the electrode 285*a* of the neon tube 285 is insufficient to cause the neon tube 285 to conduct. However, the increase of positive potential at the junction 291 increases the positive potential on the electrode 287*a* of the neon tube 287 sufficiently so that the potential difference between the electrodes of the neon tube 287 is adequate to cause the neon tube 287 to fire. When the neon tube 287 fires, a voltage pulse is produced for activating the dough discharge control circuit 60.

The increase in positive potential at the junction 298 (FIG. 6) of the logic circuit 263 causes an increase in positive potential on the electrode 295*a* of the neon tube 295. Since the electrode 295*b* of the neon tube 295 is connected to the cathode of non-conducting thyratron tube 222, zero volts appear thereon. The potential difference between the electrodes of the neon tube 295 is sufficient to cause the neon tube 295 to fire. The conduction of the neon tube 295 reduces the positive potential appearing on the electrode 297*a* of the neon tube 297. Therefore, the potential difference between the electrodes of the neon tube 297 is insufficient to cause this tube to conduct. Thus, the neon tube 297 does not activate any control circuit. After the capacitor 310 of the pulse forming circuit 315 has been discharged, the neon tubes 277, 287, and 295 are extinguished.

When a succeeding piece of dough advances across the weight checking apparatus C, it interrupts the beam of light projected toward the phototube 43. Thereupon, the relay 120 of the phototube timing circuit 44 (FIG. 4) is deenergized. This occurs just before the weight checking apparatus C attains maximum deflection. The deenergization of the relay 120 closes contacts 122 and opens contacts 121. The closing of the contacts 122 results in the instantaneous discharge of the capacitors 305–308 to extinguish the thyratron tube 220. The thyratron tubes 220–223 are prepared to receive another incoming signal from the audio amplifier 41. The opening of the contacts 121 removes the ground from the pulse forming circuit 315 and thereby enables the capacitor 310 to be charged once again.

In the event the incoming signal is representative of the weight of a piece of dough weighing less than the prescribed weight by an amount within another selected range, such as between 1 oz. and ½ oz., the magnitude of the incoming signal is sufficient to overcome the bias on the thyratron tubes 220 and 221 to cause these tubes to conduct. The thyratron tubes 222 and 223 remain non-conductive. Hence, the potentials appearing on the plates of the thyratron tubes 220 and 221 are reduced and the voltages appearing on the cathodes of the thyratron tubes 220 and 221 are increased positively from zero volts. The voltages appearing on the plates of the thyratron tubes 222 and 223 are at a maximum and the potentials appearing on the cathodes of the thyratron tubes 222 and 223 are zero volts.

The neon tubes 276 and 296 of the logic circuits 261 and 263, respectively, are conducting in the manner above-described. Although the potentials on the plates of the conducting thyratron tubes 220 and 221 are reduced, the potentials on the electrodes **264*a* and 286*a* of the neon tubes 264 and 286, respectively, are sufficiently high so that the potential differences between the electrodes of the neon tubes 264 and 286, respectively, are adequate to cause these tubes to conduct. Hence, the neon tubes 264, 276, 286, and 296 are conducting, and the positive potentials appearing at the junctions 267, 282, 291 and 298** are reduced.

After a predetermined time interval has elapsed, the relay 120 of the phototube timing circuit 44 (FIG. 4) is again energized. Thereupon, the contacts 122 open and the contacts 121 close. The closing of contacts 121 causes the pulse forming network 315 (FIG. 6) to impress on the electrodes **264*b*, 276*b*, 286*b*, and 296*b* of the neon tubes 264, 276, 286 and 296, respectively, a positive pulse. Since the neon tubes 264, 276, 286 and 296 are conducting, they tend to keep a constant voltage across their respective electrodes. This results in increases of positive potentials on the electrodes 264*a*, 276*a*, 286*a* and 296*a* of the neon tubes 264, 276, 286 and 296, respectively. Consequently, there is present increased positive potentials at the junctions 267, 282, 291 and 298 of the logic circuits 260–263**, respectively.

The conduction of the thyratron tube 220 (FIG. 4) reduces the positive potential appearing at the junction 267 of the logic circuit 260. Although the positive pulse formed by the pulse forming network 315 increases the positive potential at the junction 267, the potential difference between the electrodes of the neon tube 265 is insufficient to cause this tube to fire. Therefore, the reject control circuit 51 is not activated.

The electrode **275*b* of the neon tube 275 (FIG. 5) in the logic circuit 261 is connected to the cathode of the conducting thyratron tube 220 and the potential appearing thereon has increased positively from zero volts. The junction 282 (FIG. 5) is connected to the plate of the non-conducting thyratron tube 222, which is at maximum potential. The potential at the junction 282 is increased by the positive pulse transmitted by the pulse forming network 315. Hence, the positive potential at the junction 282 is sufficiently high so that the potential difference between the electrodes of the neon tube 277 is adequate to cause the neon tube 277 to fire without causing the neon tube 275 to conduct. When the neon tube 277 fires, a voltage pulse is produced for activating the dough discharge control circuit 63**.

In the logic circuit 262 (FIG. 5), the junction 291 is connected to the plate of the conducting thyratron tube 221, and therefore, the positive potential thereon is reduced. The conduction of the neon tube 286 further reduces the positive potential at the junction 291. Although the electrode **285*b* of the neon tube 285 is connected to the cathode of the conducting thyratron tube 220 so as to increase the potential appearing thereon positively from zero volts, the positive pulse emitted by the pulse forming network 315 raises the positive potential at the junction 291 sufficiently to cause the neon tube 285 to conduct without firing the neon tube 287. When the neon tube 285 conducts, it reduces the potential at the junction 291 to prevent the neon tube 287 from conducting. Thus, the dough discharge control circuit 60** is not activated.

The increase in positive potential at the junction 298 of the logic circuit 263 (FIG. 6) causes an increase in positive potential on the electrode **295*a* of the neon tube 295. Since the electrode 295*b* of the neon tube 295 is connected to the cathode of the non-conducting thyratron tube 222, zero volts appear thereon. The potential difference between the electrodes of the neon tube 295 is sufficient to cause the neon tube 295 to fire. The conduction of the neon tube 295 reduces the positive potential appearing on the electrode 297*a* of the neon tube 297. Therefore, the potential difference between the electrodes of the neon tube 297 is insufficient to cause this tube to conduct. Thus, the neon tube 297 does not activate the dough discharge control circuit 60. After the capacitor 310 of the pulse forming circuit 315 (FIG. 6) has been discharged, the neon tubes 277, 285 and 295** are extinguished.

When a succeeding piece of dough advances across the weight checking apparatus C, it interrupts the beam of light projected toward the phototube 43. Thereupon, the relay 120 (FIG. 4) of the phototube timing circuit 44 is deenergized. This occurs just before the weight checking apparatus C attains maximum deflection. The deenergization of the relay 120 closes contacts 122 and opens contacts 121. The closing of the contacts 122 results in the instantaneous discharge of the capacitors 305–308 to extinguish the thyratron tubes 220 and 221, respectively. The thyratron tubes 220–223 are prepared to receive another incoming signal from the amplifier 41 (FIG. 4). The opening of the contacts 121 removes the ground from the pulse forming circuit 315 and thereby enables the capacitor 310 to be charged once again.

In case the incoming signal is representative of the weight of a piece of dough weighing less than the prescribed weight by an amount within a predetermined quantity, such as one-half ounce, the magnitude of the incoming signal is sufficient to overcome the bias on the thyratron tubes 220–222 (FIGS. 4 and 5). The thyratron tubes 220–222 conduct and the thyratron tube 223 remains non-conductive. Hence, the potentials appearing on the plates of the thyratron tubes 220–222 are reduced and voltages appearing on the cathodes of the thyratron tubes 220–222 are increased positively from zero volts. The voltage appearing on the plate of the thyratron tube 223 is at a maximum and the potential appearing on the cathode of the thyratron tube 223 is zero volts.

The neon tube 296 of the logic circuit 263 (FIG. 6) is conducting for reasons previously advanced. Although the potentials on the plates of the conducting thyratron tubes 220–222 are reduced, the potentials on the electrodes **264*a*, 276*a* and 286*a* of the neon tubes 264, 276 and 286, respectively, are sufficiently high so that the potential between the electrodes of the neon tubes 264, 276 and 286, respectively, are adequate to cause these tubes to conduct. Hence, the neon tubes 264, 276, 286, and 297** are conducting and the positive potentials appearing at the junctions 261, 282, 291 and 298 are reduced.

After a predetermined time interval has elapsed, the relay 120 (FIG. 4) of the phototube timing circuit 44 is again energized. Thereupon, the contacts 122 open and the contacts 121 close. The closing of the contacts 121 causes the pulse forming network 315 (FIG. 6) to impress on the electrodes 264*b*, 276*b*, 286*b* and 296*b* of the neon tubes 264, 276, 286 and 296, respectively, a positive pulse. Since the neon tubes 264, 276, 286, and 296 are conducting, they tend to keep a constant voltage across their respective electrodes. This results in increases of positive potentials on the electrodes 264*a*, 276*a*, 286*a*, and 296*a* of the neon tubes 264, 276, 286 and 296, respectively. Consequently, there is present increased positive potentials at the junctions 267, 282, 291 and 298 of the logic circuits 260–263, respectively.

The conduction of the thyratron tube 220 reduces the positive potential appearing at the junction 267 of the logic circuit 260. Although the positive pulse formed by the pulse forming network 315 increases the positive potential at the junction 267, the potential difference between the electrodes of the neon tube 265 is insufficient to cause this tube to fire. Therefore, the reject control circuit 51 is not activated.

In the logic circuit 261 (FIG. 5), the junction 282 is connected to the plate of the conducting thyratron tube 222 and, therefore, the positive potential thereon is reduced. The conduction of the neon tube 276 further reduces the positive potential at the junction 282. Although the electrode 275*b* of the neon tube 275 is connected to the cathode of the conducting thyratron tube 220 so as to increase the potential appearing thereon positively from zero volts, the positive pulse emitted by the pulse forming network 315 raises the positive potential at the junction 282 sufficiently to cause the neon tube 275 to conduct without firing the neon tube 277. When the neon tube 275 conducts, it reduces the potential at the junction 282 to prevent the neon tube 277 from conducting. Thus, the dough discharge control circuit 63 is not activated.

As to the logic circuit 262 (FIG. 5) the junction 291 is connected to the plate of the conducting thyratron tube 221 and, therefore, the positive potential thereon is reduced. The conduction of the neon tube 286 further reduces the positive potential at the junction 291. Although the electrode 285*b* of the neon tube 285 is connected to the cathode of the conducting thyratron tube 220 so as to increase the potential appearing thereon positively from zero volts, the positive pulse emitted by the pulse forming network 315 raises the positive potential at the junction 291 sufficiently to cause the neon tube 285 to conduct without firing the neon tube 287. When the neon tube 285 conducts, it reduces the potential at the junction 291 to prevent the neon tube 287 from conducting. Thus the neon tube 287 does not activate any control circuit.

The electrode 295*b* of the neon tube 295 in the logic circuit 263 (FIG. 6) is connected to the cathode of the conducting thyratron tube 222 and the potential thereon has increased positively from zero volts. The junction 298 is connected to the plate of the non-conducting thyratron 223, which is at maximum potential. The potential at the junction 298 is increased by the positive pulse transmitted by the pulse forming network 315. Hence, the positive potential at the junction 298 is sufficient to fire the neon tube 297 without causing the neon tube 295 to conduct. When the neon tube 297 fires, a voltage pulse is produced for activating the dough discharge control circuit 60. After the capacitor 310 of the pulse forming network 315 has been discharged, the neon tubes 275, 285 and 297 are extinguished.

When a succeeding piece of dough advances across the weight checking apparatus C, it interrupts the beam of light projected toward the phototube 43. Thereupon, the relay 120 of the phototube timing circuit 44 is deenergized. This occurs just before the weight checking apparatus C attains maximum deflection. The deenergization of the relay 120 closes contacts 122 and opens contacts 121. The closing of the contacts 122 results in the instantaneous discharge of the capacitors 305–308 to extinguish the thyratron tubes 220–222. The thyratron tubes 220–223 are prepared to receive another incoming signal from the audio amplifier 41 (FIG. 4). The opening of the contacts 121 removes the ground from the pulse forming network 315 and thereby enables the capacitor 310 to be charged once again.

If the incoming signal is representative of the weight of a piece of dough weighing at least the prescribed weight, the magnitude of the incoming signal is sufficient to overcome the bias on the thyratron tubes 220–223. Hence, the potentials appearing on the plates of thyratron tubes 220–223 are reduced and the voltages appearing on the cathodes of the thyratron tubes 220-223 are increased positively from zero volts.

Although the potentials on the plates of the conducting thyratron tubes 220–223 are reduced, the potentials on the electrodes 264*a*, 276*a*, 286*a* and 296*a* of the neon tubes 264, 276, 286 and 296, respectively, are sufficient to cause these tubes to conduct. Hence, the neon tubes 264, 276, 286 and 296 are conducting and the positive potentials appearing at the junctions 267, 282, 291, and 298 are reduced.

After a predetermined time interval has elapsed, the relay 120 of the phototube timing circuit 44 is again energized. Thereupon, the contacts 122 open and the contacts 121 close. The closing of the contacts 121 causes the pulse forming network 315 (FIG. 6) to impress on the electrodes 264*b*, 276*b*, 286*b* and 296*b* of the neon tubes 264, 276, 286, and 296, respectively, a positive pulse. Since the neon tubes 264, 276, 286 and 296 are conducting, they tend to keep a constant voltage across their respective electrodes. This results in increases of positive potentials on the electrodes 264*a*, 276*a*, 286*a* and 296*a* of the neon tubes 264, 276, 286 and 296, respectively. Consequently, there is present increased positive potentials at the junctions 267, 282, 291, and 298 of the logic circuits 260–263, respectively.

The conduction of the thyratron tube 220 (FIG. 4) reduces the positive potential appearing at the junction 267 of the logic circuit 260. Although the positive pulse formed by the pulse forming network 315 increases the potential at the junction 267, the potential difference between the electrodes of the neon tube 265 is insufficient to cause, this tube to fire. Therefore, the reject control circuit 51 (FIGS. 4 and 7) is not activated.

In the logic circuit 261 (FIG. 5), the junction 282 is connected to the plate of the conducting thyratron tube 222 and, therefore, the positive potential thereon is reduced. The conduction of the neon tube 276 further reduces the positive potential at the junction 282. Although the electrode 275*b* of the neon tube 275 is connected to the cathode of the conducting thyratron tube 220 so as to increase the potential appearing thereon positively from zero volts, the positive pulse emitted by the pulse forming network 315 (FIG. 6) raises the positive potential at the junction 282 sufficiently to cause the neon tube 275 to conduct without firing the neon tube 277. When the neon tube 275 conducts, it reduces the potential at the junction 282 to prevent the neon tube 277 from conducting. Thus, the dough discharge control circuit 63 (FIG. 5) is not activated.

As to the logic circuit 262 (FIG. 5), the junction 291 is connected to the plate of the conducting thyratron tube 221 and, therefore, the positive potential thereon is reduced. The conduction of the neon tube 286 further reduces the positive potential at the junction 291. Although the electrode 285*b* of the neon tube 285 is connected to the cathode of the conducting thyratron tube 220 so as to increase the potential appearing thereon positively from zero volts, the positive pulse emitted by the pulse forming network 315 raises the positive potential at the junction 291 sufficiently to cause the neon tube 285 to conduct without firing the neon tube 287. When the neon tube 285 conducts, it reduces the potential at the junction 291 to prevent the neon tube 287 from conducting. Thus the neon tube 287 does not activate the dough discharge control circuit 60 (FIG. 5).

In the logic circuit 263 (FIG. 6), the junction 298 is connected to the plate of the conducting thyratron tube 223 and, therefore, the positive potential thereon is reduced. The conduction of the neon tube 296 further reduces the positive potential at the junction 298. Although the electrode 295*b* of the neon tube 295 is connected to the cathode of the conducting thyratron tube 222 so as to increase the potential appearing thereon positively from zero volts, the positive pulse emitted by the pulse forming network 315 raises the positive potential appearing at the junction 298 sufficiently to cause the neon tube 295 to conduct without firing the neon tube 297. When the neon tube 295 conducts, it reduces the potential at the junction 298 to prevent the neon tube 297 from conducting. Thus, the neon tube 297 does not activate the dough discharge control circuit 60 (FIG. 5).

The reject control circuit 51 (FIGS. 4 and 7) comprises conventional multivibrators 325–327 which are connected in cascade. Triode tubes 328–330 of the multivibrators 325–327, respectively, are biased to cut-off, while triode tubes 331–333 of the multivibrators 325–327, respectively, are normally conducting. When a positive pulse is produced by the firing of the neon tube 265 (FIG. 4), the pulse is of sufficient magnitude to cause the tube 328 of the multivibrator 325 to conduct, thereby rendering the tube 331 of the multivibrator 325 non-conductive. Included in the multivibrator 325 is a time delay network 334 that comprises a capacitor 335, a resistor 336, a resistor 337 and a potentiometer 338. The time delay network 334 determines the time delay interval in which the tube 331 of the multivibrator 325 returns from the non-conducting state to its initial conducting state. After the tube 331 returns to its conducting state, the tube 328 of the mulivibraor 325 is again biased to cut-off and transmits a positive pulse to the triode tube 329 of the multivibrator 326 through a capacitor 339.

The positive pulse transmitted to the multivibrator 326 (FIG. 4) is of sufficient magnitude to cause the tube 329 of the multivibrator 326 to conduct, thereby rendering the tube 332 of the multivibrator 326 non-conductive. Included in the multivibrator 326 is a time delay network 340 that comprises a capacitor 341, a resistor 342 and a resistor 343. The time delay network 340 determines the time delay interval in which the tube 332 of the multivibrator 326 returns from the non-conducting state to its initial conducting state. After the tube 332 returns to its conducting state, the tube 329 of the multivibrator 326 is again biased to cut-off and transmits a positive pulse to the triode tube 330 of the multivibrator 327 (FIG. 7) through a capacitor 358 and over a conductor 345.

Upon receiving the positive pulse, the tube 330 of the multivibrator 327 conducts, thereby rendering the tube 333 of the multivibrator 327 non-conductive. The multivibrator 327 includes a time delay network 346 that comprises a capacitor 347, a resistor 348 and a resistor 349. The time delay network 346 determines the time interval in which the tube 333 of the multivibrator 327 returns from the non-conducting state to its initial conducting state, the tube 330 of the multivibrator 327 is again biased to cut-off and transmits a positive pulse.

Connected to the output of the multivibrator 327 is a duo-diode tube 350 that includes diodes 351 and 352. The positive pulse produced by the multivibrator 327 is transmitted to the grid of a thyratron tube 353 (FIG. 7) through a capacitor 359, the diode 352 of the duo-diode tube 350 and a reject duration control network 354. The thyratron tube 352 is biased to cut-off and conducts when the positive pulse produced by the multivibrator 327 is impressed on the grid thereof. An alternating current potential is impressed on the plate of the thyratron tube 353 over the following path: plate of the thyratron tube 353, capacitor 355, resistor 356, conductor 357, conductor 193, source of alternating current 192 (FIG. 7), conductor 196, and ground. Therefore, when the potential impressed on the grid of the thyratron tube 353 reaches cut-off, the thyratron tube 353 will be extinguished on the next negative half-cycle of the source of alternating current 192. The diode 351 of the duo-diode tube 350 is provided for by-passing the negative pulse that may be produced by multivibrator 327.

In series with the plate of the thyratron tube 353 is a relay 360 that is energized when the thyratron tube 353 conducts. The relay 360 is normally de-energized and, hence, contacts 362 are normally closed to energize the normally operated clutch 52 (FIG. 8) of the reversible conveyor E over the following path: contacts 362, conductor 363, clutch 52, power supply 365, conductor 366, conductor 367 and contacts 362. When the clutch 52 is energized, the reversible conveyor E travels in the direction shown by the arrow 31 (FIG. 2) in a manner described in detail in the aforementioned application.

When the relay 360 is energized, contacts 362 open and contacts 361 close. The breaking of the contacts 362 opens the energizing circuit for the clutch 52 to disengage the clutch. The closing of the contacts 361 completes an energizing circuit for the reject clutch 53 (FIG. 8) of the reversible conveyor E over the following path: contacts 361, conductor 368, clutch 53, conductor 364, power supply 365, conductor 366, conductor 367 and contacts 361. When the clutch 53 is energized, the clutch is engaged and the direction of travel of the reversible conveyor E is reversed, whereby a piece of dough on the reversible conveyor E is advanced in the direction shown by the arrow 32 (FIG. 2).

The reject control circuit 51 is arranged so that the time interval between the deenergization of the relay 120 (FIG. 4) of the phototube timing circuit 44 and the energization of the reject clutch 53 (FIG. 8) is equal to the time it takes for a piece of dough to advance from the position where it interrupts the beam of light projected toward the phototube 43 and to a position where it is discharged onto the reversible conveyor E. Thus, the reject control circuit 51, by means of the multivibrators 325–327 and their associated time delay networks 334, 340 and 346, stores a reject signal and operates the reject clutch 53 in timed relation with the advancement of a piece of dough weighing less than the predetermined minimum weight, whereby the direction of travel of the reversible conveyor E is reversed at the time the piece of dough weighing less than the predetermined weight is discharged onto the reversible conveyor E. It is to be observed that the reject control circuit 51 is capable of storing more than one reject signal, since the multivibrators 325–327 are activated in succession. In addition, the reject control circuit 51 in the absence of a reject pulse causes the normally energized clutch 52 to be engaged at the time a piece of dough weighing more than a predetermined minimum weight is discharged onto the reversible conveyor E.

The reject duration control circuit 354, which comprises capacitor 370, resistor 371, resistor 372, resistor 373 and potentiometer 374, receives a pulse from the multivibrator 327 and impresses the pulse on the grid of the thyratron tube 353. The pulse impressed on the grid of the thyratron tube 353 by the duration control circuit 354 attains its maximum magnitude very rapidly and reduces its magnitude at a rate determined by the circuit parameters of the control circuit 354. Therefore, the thyratron tube 353 conducts substantially at the time the pulse is impressed on its grid by the control network 354 and extinguishes when the magnitude of the pulse is no longer sufficient to render it conductive and the negative portion of the alternating current is impressed on its plate.

The potentiometer 374 of the reject duration control circuit 354 is adjusted so that the thyratron 353 conducts and the relay 360 is energized for a time duration commensurate with the time interval between successive pieces of dough discharged onto the reversible conveyor E. In this manner, the reject clutch 53 is engaged for a sufficient period of time to enable the reversible conveyor E to discharge a piece of dough weighing less than the predetermined weight onto the reject conveyor 55 (FIG. 2) and further the reject clutch 53 will remain engaged until a piece of dough is advanced onto the reversible conveyor E that weighs more than the predetermined minimum weight, since the time interval between pulses in the reject control circuit 51 is substantially equal to the time interval between successive pieces of dough discharged onto the reversible conveyor E. In the absence of a reject pulse, the normally energized clutch 52 (FIG. 8) will be engaged at the time a piece of dough weighing more than the predetermined minimum weight is discharged onto the reversible conveyor E.

The dough discharge control circuit 60 (FIG. 5) comprises a conventional monostable multivibrator 375 having triode tubes 376 and 377. The tube 376 is biased to cut-off, while the tube 377 is conducting. When either the neon tube 287 fires or the neon tube 297 fires, a positive pulse is produced to overcome the bias on the tube 376. The tube 376 conducts and renders the tube 377 non-conductive. Included in the multivibrator 375 is a time delay network 378 that comprises capacitor 380, resistor 381, variable resistor 382, resistor 383 and resistor 384. The time delay network 378 determines the time delay interval in which the tube 377 of the multivibrator 375 returns from the non-conductive state to its initial conductive state. After the tube 377 returns to its conducting state, the tube 376 of the multivibrator 375 is again biased to cut-off and produces a positive pulse.

Connected to the output of the multivibrator 375 is a thyratron tube 385 that is biased to cut-off. In series with the plate of the thyratron tube 385 is a relay 390 which is energized while the thyratron tube 385 is conducting. The positive pulse produced by the multivibrator 375 is transmitted through a capacitor 393 to the thyratron tube 385 and is of sufficient magnitude to overcome the bias on the thyratron tube 385.

While the relay 390 is deenergized, the contacts 391 are opened and the contacts 392 are closed. The closed contacts 392 complete an energizing circuit for the brake 62 (FIG. 8) of the dough discharge apparatus F over the following path: contacts 392, conductor 394, brake 62, conductor 395, conductor 364, power supply 365, conductor 366, and conductor 396. When the brake 62 is energized, it is engaged. When the thyratron tube 385 conducts, the relay 390 is energized over the following path: the plate of the thyratron tube 385, relay 390, resistor 389, conductor 388, microswitch 387, conductor 386, conductor 191, conductor 74 and the positive side of the power supply 73. Upon the energization of the relay 390, contacts 392 break to release the brake 62 of the dough discharge apparatus F and contacts 391 close to complete the energizing circuit for the clutch 61 (FIG. 8) of the dough discharging apparatus F over the following path: contacts 391, conductor 397, clutch 61, conductor 395, conductor 364, power supply 365, conductor 366, and conductor 396. When the clutch 61 is energized, it is engaged to start the operation of the dough discharging apparatus F in a manner described in detail in the aforementioned application, whereby the dough discharging apparatus F projects a measured quantity of dough, such as ½ oz.

The variable resistor 382 of the timed delay network 378 is adjusted to delay the operation of the clutch 61 so that the time interval between the deenergization of the relay 120 (FIG. 4) and the projection of a measured quantity of dough by the dough discharging apparatus F is equal to the time it takes for the piece of dough to advance from the position where it interrupts the beam of light projected toward the phototube 43 to the position where it is discharged from the conveyor D (FIG. 2) toward the reversible conveyor E. Thus, the dough discharging apparatus F is operated in timed relation with the advancement of a piece of dough, whereby the measured quantity of dough, such as ½ oz., that is projected by the dough discharging apparatus F is deposited onto the continuously advancing piece of dough as it is discharged from the transfer conveyor D.

The thyratron tube 385 is extinguished and the relay 390 is deenergized at the time the microswitch 387 (FIG. 8) is opened. The microswitch 387 is opened, in a manner described in the aforesaid application, just prior to the completion of the cycle of operation of the dough discharging apparatus F and remains open a sufficient period of time to extinguish the thyratron tube 385. At the end of the cycle of operation of the dough discharging apparatus F, the microswitch 387 is closed to once again prepare an operating circuit for the thyratron tube 385.

When the relay 390 is deenergized by the extinguishing of the thyratron tube 385, contacts 391 break to open the energizing circuit for the clutch 61 (FIG. 8) of the dough discharging apparatus F and contacts 392 close to complete the energizing circuit for the brake 62 of the dough discharging apparatus F.

The dough discharging control circuit 63 (FIG. 5) comprises a conventional monostable multivibrator 400 having triode tubes 401 and 402. The tube 401 is biased to cut-off, while the tube 402 is conducted. When the neon tube 277 fires, a positive pulse is produced to overcome the bias on the tube 401. The tube 401 conducts and renders the tube 402 non-conductive. Included in the multivibrator 400 is a timed delay network 403 that comprises a capacitor 404, a resistor 405, a variable resistor 406, a resistor 407, and a resistor 408. The timed delay network 403 determines the time delay interval in which the tube 402 of the multivibrator 400 returns from the non-conducting state to its initial conducting state. After the tube 402 returns to its conducting state, the tube 401 of the multivibrator 400 is again biased to cut-off and produces a positive pulse.

Connected to the output of the multivibrator 400 is a thyratron tube 410 that is biased to cut-off. In series with the plate of the thyratron tube 410 is relay 411 which is energized while the thyratron tube 410 is conducting. The positive pulse produced by the multivibrator 400 is transmitted through a capacitor 415 to the thyratron tube 410 and is of sufficient magnitude to overcome the bias on the thyratron tube 410.

While the relay 411 is deenergized, the contacts 413 are closed and the contacts 412 are open. The closed contacts 413 complete an energizing circuit for the brake 65 (FIG. 8) of the dough discharging apparatus F over the following path: contacts 413, conductor 416, brake 65, conductor 417, conductor 364, power supply 365, conductor 366, conductor 396, conductor 418, and contacts 413. When the brake 65 is energized, it is engaged. While the thyratron tube 410 is conducting, the relay 411 is energized over the following path: the plate of the thyratron tube 410, conductor 419, relay 411, resistor 420, conductor 421, microswitch 422, conductor 386, conductor 191, conductor 74, and the positive side of the power supply 73. Upon the energizing of the relay 410, contacts 413 break to release the brake 65 (FIG. 8) of the dough discharging apparatus F and contacts 412 close to complete an energizing circuit for the clutch 64 (FIG. 8) of the dough discharging apparatus over the following path: contacts 412, conductor 423, clutch 64, conductor 417, conductor 364, power supply 365, conductor 366, conductor 396, conductor 418, and contacts 412. When the clutch 64 is energized, it is engaged to start the operation of the dough discharging apparatus F in a manner described in detail in the aforementioned application, whereby the dough discharging apparatus F projects a measured quantity of dough, such as one ounce.

The variable resistor 406 of the time delay network 403 is adjusted to delay the operation of the clutch 64 so that the time interval between the deenergization of the relay 120 (FIG. 4) and the projection of the measured quantity of dough by the dough discharging apparatus F is equal to the time it takes for the piece of dough to advance from the position where it interrupts the beam of light projected toward the phototube 43 to the position where it is discharged from the conveyor D (FIG. 2) toward the reversible conveyor E. Thus, the dough discharging apparatus F is operated in timed relation with the advancement of a piece of dough, whereby the measured quantity of dough, such as one ounce, that is projected by the dough discharge apparatus F is deposited onto the continuously advancing piece of dough as it is discharged from the transfer conveyor D.

The thyratron tube 410 is extinguished by the opening of the microswitch 422 and deenergizes the relay 411. The microswitch 422 is opened, in a manner described in detail in the aforementioned application, just prior to the completion of the cycle of operation of the dough discharging apparatus F and remains open for a sufficient time duration to extinguish the thyratron tube 410. At the end of the cycle of the operation of the dough discharging apparatus F, the microswitch 422 is closed to prepare an operating circuit for the thyratron tube 410.

When the relay 411 is deenergized, contacts 412 break to open the energizing circuit for the clutch 64 of the dough discharing apparatus F and contacts 413 close to complete the energizing circuit for the brake 65 of the dough discharging apparatus F.

Although the function and operation of each component of the electronic control circuits H have been described in connection with its particular circuitry, the overall operation of the circuits as pieces of dough are advanced will be described. In the operation of the electronic circuits of the present invention, the transducer 40 (FIGS. 3, 4 and 7) transmits voltage signals in succession that are respectively representative of the weight of pieces of dough advancing in succession across the weight checking apparatus C. Each piece of dough advancing across the weight checking apparatus C interrupts the beam of light projected by the light source 42 (FIG. 7) toward the phototube 43 (FIG. 7) just before maximum deflection of the scale of the weight checking apparatus C is attained due to the weight imposed thereon. During the time the light beam is interrupted, the relay 120 of the phototube timing circuit 44 is deenergized. After a predetermined time interval has elapsed, the relay 120 is returned to its initial energized condition.

The successive voltage signals that are representative of the weight of pieces of dough advancing in succession across the weight checking apparatus C are amplified by the audio amplifier 41 (FIG. 4) and are transmitted to the divider control circuit 45 (FIG. 4) and to the weight classifying circuit 50 (FIGS. 4–6).

Included in the divider control circuit 45 is the detector circuit 140 (FIG. 4) that converts the successive voltage signals transmitted by the amplifier 41 into a series of pulses respectively representative of the difference between the desired weight and the weight of pieces of dough advancing in succession across the weight checking apparatus C. The series of pulses are received by the averaging network 160 (FIG. 4), which has a relatively long time constant compared with the time duration between successive pulses. The averaging network 160 produces an average signal from the series of pulses and transmits the continuous average signal to the differential detector 165. The differential detector 165 compares the average signal with a reference voltage to control the direction of rotation of the reversible divider control motor 46 and compares the magnitude of the average signal with a gradually increasing reference voltage of a like polarity to control the angular displacement of the motor 46. In this manner, the dough dividing machine A is adjusted through the operation of its motor to regulate the weight of pieces of dough formed therein to compensate for a weight variation between a desired weight and the average weight of pieces of dough advancing in succession across the weight checking apparatus C.

If a piece of dough advancing across the weight checking apparatus C weighs less than the predetermined minimum weight, the voltage signal transmitted by the amplifier 41 is insufficient to overcome the bias on the thyratron tubes 220–223 of the classifying circuit 50 (FIGS. 4–6). As a consequence thereof, the neon tube 265 of the logic circuit 260 (FIG. 4) fires to produce a pulse for activating the reject control circuit 51. The pulse is produced by the firing of the neon tube 265 at a time controlled by the phototube timing circuit 44, which occurs when a predetermined time interval has elapsed after the beam of light projected toward the phototube 43 is interrupted.

The reject control circuit 51 is activated by the pulse and delays the energization of the reject clutch 53 (FIG. 8) for a time duration equal to the time it takes for a piece of dough interrupting the beam of light projected across the weight checking apparatus C to be discharged onto the reversible conveyor E. Hence, the reject control circuit 51 operates the reject clutch 53 in timed relation with the advancement of a piece of dough weighing less than the predetermined minimum weight, whereby the direction of travel of the reversible conveyor E is reversed at the time the piece of dough is discharged onto the reversible conveyor E.

In case a piece of dough advancing across the weight checking apparatus C weighs less than the prescribed weight by an amount with a selected range, such as 1½ ozs. and 1 oz., the magnitude of the voltage signal transmitted by the amplifier 41 is sufficient to overcome the bias on the thyratron tube 220 of the classifying circuit 50 (FIGS. 4–6). Hence, the thyratron tube 220 conducts and the thyratron tubes 221–223 remains non-conductive. As a result thereof, the neon tubes 277 and 287 of the logic circuits 261 and 262, respectively, fire. The neon tube 265 of the logic circuit 260 does not conduct and, hence the reject control circuit 51 is not activated. The firing of the neon tube 277 produces a pulse for activating the dough discharge control circuit 63 and the firing of the neon tube 287 produces a pulse for activating the dough discharge control circuit 60. The pulses are produced at a time controlled by the phototube timing circuit 44 (FIG. 4), which occurs when a predetermined time interval has elapsed after the beam of light projected toward the phototube 43 is interrupted. The dough discharge control circuits 60 and 63 operate simultaneously to cause the dough discharging apparatus F to project a measured quantity of dough, such as one and one-half ounces, onto the continuously advancing piece of dough, which weighs less than the prescribed weight within the selected range, as the piece of dough is discharged from the conveyor D (FIG. 2).

In the event a piece of dough advancing across the weight checking apparatus C weighs less than the prescribed weight within another selected range, such as between one-half ounce and one ounce, the magnitude of the voltage signal transmitted by the amplifier 41 is sufficient to overcome the bias on the thyratron tubes 220 and 221 of the classifying circuit 50. Hence, the thyratron tubes 220 and 221 conduct, and the thyratron tubes 222 and 223 remain non-conductive. Consequently, the neon tube 277 of the logic circuit 261 fires. The neon tubes 265, 287 and 297 do not fire. The firing of the neon tube 277 produces a pulse for activating the dough discharge control circuit 63. The pulse is produce at a time controlled by the phototube timing circuit 44, which occurs when a predetermined time interval has elapsed after the beam of light projected across the weight checking apparatus C is interrupted. The dough discharge control circuit 63 is activated and delays the release of the brake 65 and the engagement of the clutch 64 of the dough discharging apparatus F so that the time interval between the deenergization of the relay 120 (FIG. 4) and the projection of the measured quantity of dough by the dough discharging apparatus F is equal to the time it takes for a piece of dough interrupting the beam of light projected across the weight checking apparatus C to be discharged from the conveyor D (FIG. 2). Thus, the dough discharging apparatus F is operated in timed relation with the advancement of the piece of dough weighing less than the prescribed weight within the selected range, whereby the measured quantity of dough, such as one ounce, is projected by the dough discharging apparatus F onto the continuously advancing piece of dough as it is discharged from the conveyor D.

If a piece of dough advancing across the weight checking apparatus C weighs less than the prescribed weight by an amount less than a predetermined quantity, such as one-half ounce, the magnitude of the voltage signal transmitted by the amplifier 41 is sufficient to overcome the bias on the thyratron tubes 220–222 of the weight classifying circuit 50. Hence, the thyratron tubes 220–222 conduct and the thyratron tube 223 remains non-conductive. As a consequence, thereof, the neon tube 297 of the logic circuit 263 (FIG. 6) fires and the neon tubes 265, 277 and 287 do not fire. The firing of the neon tube 297 produces a pulse for activating the dough discharge control circuit 60. The pulse is produced at a time controlled by the phototube timing circuit 44, which occurs when a predetermined time interval has elapsed after the beam of light projected across the weight checking apparatus C is interrupted. The dough discharge control circuit 60 is activated and delays the release of the brake 62 (FIG. 8) and the energization of the clutch 61 of the dough discharging apparatus F so that the time interval between the deenergization of the relay 120 (FIG. 4) and the projection of the measured quantity of dough by the dough discharging apparatus F is equal to the time it takes for a piece of dough, interrupting the beam of light projected across the weight checking apparatus C, to be discharged from the conveyor D (FIG. 2). Thus, the dough discharging apparatus F is operated in timed relation with the advancement of the piece of dough weighing less than the prescribed weight by an amount not in excess of the predetermined quantity, whereby the measured quantity of dough, such as one-half ounce, is projected by the dough discharging apparatus F onto the continuously advancing piece of dough as it is discharged from the conveyor D.

In case a piece of dough advancing across the weight checking apparatus C weighs at least the prescribed weight, the magnitude of the voltage signal transmitted by the amplifier 41 (FIG. 4) is sufficient to cause the thyratron tubes 220–223 to conduct. As a result thereof, the neon tubes 265, 277, 287 and 297 of the logic circuits 260–263, respectively, do not fire. Therefore, at the time the piece of dough weighing at least the prescribed weight is discharged onto the reversible conveyor E, the normally engaged clutch 52 (FIG. 8) is energized. When the clutch 52 is engaged, the reversible conveyor E advances the piece of dough thereon toward the conveyor 54 (FIG. 2) for further processing.

Although the present invention has been described in connection with the processing of pieces of dough, it will be recognized that the inventive concepts disclosed herein may be employed in connection with other articles or objects that are classifiable by weight or other qualities.

It will be understood that modifications and variations of the embodiments of the invention disclosed herein may be resorted to without departing from the spirit of the invention and the scope of the appended claims.

Having thus described the invention, what is claimed as new and desired to be protected by Letters Patent is:

1. In a weighing apparatus, a combined time delay and control circuit comprising detecting means for providing a weight signal pulse, a plurality of monostable multivibrators connected in cascade and each incorporating a time delay recovery circuit, said multivibrators acting automatically to sequentially trigger the following multivibrator when the first in the series receives a signal pulse, a thyratron tube, a diode connected between the grid of the thyratron tube and the plate of the normally cut-off section of the final multivibrator, a source of alternating current for the plate of the thyratron tube, and control relay means in the plate circuit of said thyratron tube.

2. In a weighing apparatus, a combined time delay and control circuit comprising detecting means for providing a weight signal pulse, a plurality of monostable multivibrators connected in cascade and each incorporating a time delay recovery circuit, said multivibrators acting automatically to sequentially trigger the following multivibrator when the first in the series receives a signal pulse, a thyratron tube, a double diode connected between the grid of the thyratron tube and the plate of the normally cut-off section of the final multivibrator, one of said diodes transmitting a pulse of one polarity from the final multivibrator to the thyratron grid, the other diode being connected to bypass pulses of opposite polarity arising in the final multivibrator, a source of alternating current for the plate of the thyratron tube, and control relay means in the plate circuit of said thyratron tube.

3. In a weight checking apparatus, a scale, means for moving articles to be weighed across the scale, means for producing signals representative of article weight, a plurality of progressively biased electron tubes for receiving weight signals and conducting accordingly, a plurality of path-establishing logic circuits under control of said electron tubes, a plurality of weight classification control circuits selectively actuatable by said logic circuits, means for sensing the presence of an article on said scale, an independent timer activated by said article sensing means, means controlled by said timer for applying a pulse through the previously established path in said logic circuits after a predetermined time for energizing said weight classification control circuits, said weight classification control circuits each including a monostable multivibrator, a gas tube controlled by the multivibrator, and a relay controlled by the gas tube, said multivibrator storing the signal from said logic circuits and passing it to the gas tube after a predetermined length of time, to accommodate resetting of the electron tube and logic circuits by said timer.

4. In a weight checking apparatus, a scale, means for moving articles to be weighed across the scale, means for producing signals representative of article weight, a plurality of progressively biased electron tubes for receiving weight signals and conducting accordingly, a plurality of path-establishing logic circuits under control of said electron tubes, a plurality of weight classification control circuits selectively actuatable by said logic circuits, means for sensing the presence of an article on said scale, an independent timer activated by said article sensing means, means controlled by said timer for applying a pulse through the previously established path in said logic circuits after a predetermined time for energizing said weight classification control circuits, the interval of said timer being at least as long as the time required for an article to cross said sensing means at the scale.

5. In a weight checking apparatus, a scale, means for moving articles to be weighed across the scale, means for producing signals representative of article weight, a plurality of progressively biased thyratrons for receiving weight signals and conducting accordingly, a plurality of path-establishing logic circuits under control of said thyratrons, a plurality of weight classification control circuits selectively actuatable by said logic circuits, means for sensing the presence of an article on said scale, said sensing means including circuit means for extinguishing previously fired thyratrons upon sensing the presence of a newly presented article at the scale, an independent timer activated by said article sensing means, and means controlled by said timer for applying a pulse through the previously established path in said logic circuits after a predetermined time for energizing said weight classification control circuits.

References Cited in the file of this patent

UNITED STATES PATENTS 2,577,762 Hoeppner ---------------- Dec. 11, 1951
2,688,441 Merrill ------------------- Sept. 7, 1954
2,688,458 Schieser ------------------ Sept. 7, 1954
2,732,067 Cunningham -------------- Jan. 24, 1956
2,933,185 Coleman ----------------- Apr. 19, 1960
2,936,886 Harmon ------------------ May 17, 1960
2,950,640 Camp -------------------- Aug. 30, 1960

OTHER REFERENCES

Walker Industrial Applications of Gas-Filled Triodes, 1950, Chapman & Hall Ltd.